(12) United States Patent
Izaki et al.

(10) Patent No.: US 6,556,122 B2
(45) Date of Patent: Apr. 29, 2003

(54) THERMAL FUSE, BATTERY PACK, AND METHOD OF MANUFACTURING THERMAL FUSE

(75) Inventors: Masatoshi Izaki, Miyazaki (JP); Takahiro Mukai, Miyazaki (JP); Shinichi Ohtsuka, Miyazaki (JP); Kenzo Isozaki, Miyazaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/909,504

(22) Filed: Jul. 20, 2001

(65) Prior Publication Data

US 2002/0113685 A1 Aug. 22, 2002

(30) Foreign Application Priority Data

Jul. 21, 2000 (JP) ........................................ 2000-220452

(51) Int. Cl.[7] .................. H01H 85/046; H01H 85/055; H01M 2/34; H01M 10/02

(52) U.S. Cl. .................... 337/405; 337/414; 337/159; 337/186; 337/290; 337/297; 337/416; 429/7; 429/61; 429/150

(58) Field of Search .................. 337/405, 414, 337/416, 158, 159, 186, 290, 297; 429/7, 61, 62, 150

(56) References Cited

U.S. PATENT DOCUMENTS

| | | | | |
|---|---|---|---|---|
| 4,494,104 A | * | 1/1985 | Holmes | 337/403 |
| 5,097,247 A | * | 3/1992 | Doerrwaechter | 337/405 |
| 5,939,969 A | * | 8/1999 | Doerrwaechter et al. | 337/297 |
| 5,982,268 A | | 11/1999 | Kawanishi | |
| 6,040,754 A | | 3/2000 | Kawanishi | |
| 6,373,371 B1 | * | 4/2002 | Doerrwaechter et al. | 337/297 |

FOREIGN PATENT DOCUMENTS

| | | | | |
|---|---|---|---|---|
| EP | 0 964 419 | | 12/1999 | |
| GB | 2205455 A | * | 12/1988 | .......... H01H/85/04 |
| JP | 56-69735 | | 6/1981 | |

(List continued on next page.)

OTHER PUBLICATIONS

Office Action form Japanses Patent Office, dated Mar. 26, 2002 (for corresponding JP Patent Application No. 2000–220452).
Office Action from Japanese Patent Office, dated Apr. 2, 2002 (for corresponding JP Patent Application No. 2001–369819).
Office Action from Japanese Patent Office, dated Apr. 2, 2002 (for corresponding JP Patent Application No.2001–269820).

(List continued on next page.)

Primary Examiner—Anatoly Vortman
(74) Attorney, Agent, or Firm—RatnerPrestia

(57) ABSTRACT

A thermal fuse reduced in size and thickness can be obtained. Further, the thermal fuse will not be degraded in characteristics, productivity, reliability, quality, etc. even after reduction in size and thickness. The thermal fuse includes a fuse main body including a substrate, a fusible metal and a cover, and paired terminals disposed protruding from the fuse main body. The other end of the first terminal has a first fusible metal connection, and the other end of the second terminal has a second fusible metal connection. The fusible metal is disposed between the first terminal and the second terminal, and one end of the fusible metal is connected to the first fusible metal connection, and the other end of the fusible metal is connected to the second fusible metal connection. The cover is disposed so as to cover the fusible metal, the first fusible metal connection, and the second fusible metal connection. Length L1 and thickness L3 of the fuse main body located between the first terminal and the second terminal are respectively in the ranges of 2.0 mm<L1<8.5 mm and 0.4 mm<L3<2.5 mm.

43 Claims, 24 Drawing Sheets

FOREIGN PATENT DOCUMENTS

| | | | | |
|---|---|---|---|---|
| JP | 58-14643 | 7/1981 | | |
| JP | 62-41641 | 3/1987 | | |
| JP | 02100221 A | * 4/1990 | .......... | H01H/37/76 |
| JP | 04073835 A | * 3/1992 | .......... | H01H/37/76 |
| JP | 04129123 A | * 4/1992 | .......... | H01H/37/76 |
| JP | 05-198246 | 8/1993 | | |
| JP | 02-244530 | 3/1994 | | |
| JP | 08-031283 | 2/1996 | | |
| JP | 09-017302 | 1/1997 | | |
| JP | 1-16466 | 1/1999 | | |
| JP | 11-353995 | 12/1999 | | |
| JP | 2000-036237 | 2/2000 | | |
| JP | 2000-113784 | 4/2000 | | |
| JP | 2000-164093 | 6/2000 | | |
| JP | 2001-229796 | 8/2001 | | |
| JP | 2001-345035 | 12/2001 | | |

OTHER PUBLICATIONS

Notification from Japanese Patent Office, dated Jun. 4, 2002 (for corresponding JP Patent Application No. 2000–220452).

Office Action for German Application No. 101 35 256.5–34 dated Oct. 28, 2002 (English translation).

* cited by examiner

RELATIONSHIP BETWEEN TENSILE FORCE AND ELONGATION

THERMAL FUSE, BATTERY PACK, AND METHOD OF MANUFACTURING THERMAL FUSE

FIELD OF THE INVENTION

The present invention relates to a thermal fuse used to prevent equipment from being damaged due to overheat, and a battery pack.

BACKGROUND OF THE INVENTION

Recently, the advance in technical development of secondary batteries is very remarkable. Particularly, as batteries used for equipment such as cellular phones, PHS, and notebook sized personal computers, secondary batteries which are compact and can be used for a long time per charge are developed and put to practical use. Specifically, batteries such as Ni—Cd cells, Ni—H cells, Li-ion cells, and Li-polymer cells are increasingly developed and put to practical use, enhancing the development of secondary batteries which are smaller in size and have a long service life.

However, with reduction in size of the batteries, heat is generated due to rapid discharge, for example, caused by short-circuiting between positive and negative electrodes. And it gives rise to a fear of damage or explosion of the batteries. In order to prevent such problem, a thermal fuse is used, which blows when heat is generated due to short-circuiting or the like, thereby assuring safety of the secondary batteries. As a thermal fuse like this, a thermal fuse using a fusible metal is commonly employed. Such fusible metal is attached via an insulating layer to a part which may heat in a battery or power source equipment. When a battery or power source equipment is heated, the fusible metal is melted to break the circuit before the temperature reaches a dangerous level. Thus, discharging or charging of the battery is discontinued to prevent overheating of the battery. Further, breakdown of the power source equipment due to heat can be prevented.

FIGS. 22, 23, 24 show a conventional thermal fuse. In FIGS. 22, 23, 24, the conventional thermal fuse used is a thin-type fuse, comprising lead conductors 40, 41, and an insulating plate 42. The conventional thermal fuse has an insulating plate 42 having a width greater than that of the lead conductor 40, 41.

Inter-terminal distance "d" between the lead conductor 40 and lead conductor 41 is less than the width of fusible alloy welding position 46. Therefore, the inter-terminal distance d is shorter than the fusing distance when the thermal fuse is normally fused.

FIG. 21 is a perspective view of a conventional battery pack. The battery pack is used as a square battery pack whose thickness is identical with the width of the insulating plate 42.

The conventional battery pack ranges from 6 mm to 5 mm in thickness. However, with the recent reduction in size and thickness of cellular phones, there has been an increasing demand for pack batteries of smaller and thinner type ranging from 2.5 mm to 4 mm in thickness. However, in a conventional thin-type thermal fuse, there has been a problem such that the width of insulating plate 42 cannot be reduced without reducing the width of lead conductors 40, 41. Also, there has been a limit to size reduction with respect to the lengthwise direction of the insulating plate since the withstand voltage distance between terminals is the above inter-terminal distance "d" in an air atmosphere.

Also, in case the conventional thermal fuse is merely reduced in size, deterioration of various characteristics such as bonding strength of each member and thermal response will take place as a matter of course.

The present invention provides a thermal fuse and battery pack which ensure excellent reliability, high quality and low cost, with power less consumed by the wiring in the battery body, even after being reduced in size.

SUMMARY OF THE INVENTION

A thermal fuse of the present invention comprises:

(a) a fuse main body having a substrate, a fusible metal and a cover;

(b) a pair of terminals protruding from the fuse main body, the pair of terminals including a first terminal and a second terminal, one end of the first terminal protruding from one end of the fuse main body, and one end of the second terminal protruding from the other end of the fuse main body, wherein the other end of the first terminal includes a first fusible metal connection;

the other end of the second terminal includes a second fusible metal connection;

the fusible metal is disposed between the first terminal and the second terminal;

one end of the fusible metal is connected to the first fusible metal connection, and the other end of the fusible metal is connected to the second fusible metal connection;

the cover is disposed so as to cover the fusible metal, the first fusible metal connection, and the second fusible metal connection; and length L1 of the fuse main body positioned between the first terminal and the second terminal and thickness L3 of the main body are in a relationship as follows:

$$2.0 \text{ mm} < L1 < 8.5 \text{ mm}$$

$$0.4 \text{ mm} < L3 < 2.5 \text{ mm}.$$

A battery pack of the present invention comprises:
(i) a battery;
(ii) a main boy to accommodate the battery;
(iii) a wire led out of the main body and electrically connected to the battery; and
(iv) a thermal fuse disposed between the wire so as to contact with the main body,
wherein the thermal fuse comprises the above mentioned structure.

Preferably, the width of the first fusible metal connection is less than the width of the first terminal, and the width of the second fusible metal connection is less than the width of the second terminal.

Preferably, the fuse main body further comprises an bonding film disposed between the substrate and the cover, and the bonding film has a third through-hole, while the fusible metal, the first fusible metal connection and the second fusible metal connection are located in the third through-hole.

Preferably, each terminal of the first terminal and the second terminal ranges from $3 \times 10^{10}$ Pa to $8 \times 10^{10}$ Pa in Young's modulus, and from $4 \times 10^8$ Pa to $6 \times 10^8$ Pa in tensile strength.

A method of manufacturing a thermal fuse of the present invention comprises the steps of:

(a) manufacturing at least one substrate of a strip substrate and a plate substrate;

(b) disposing a first terminal and a second terminal opposed to each other on the substrate, where one end of the first terminal includes a first fusible metal connection, and one end of the second terminal includes a second fusible metal connection, the first fusible metal connection and the second fusible metal connection are opposed to each other on the substrate, and the other ends of the first terminal and the second terminal protrude in the respective directions of the substrate;

(c) placing an bonding film on the substrate with the first terminal and the second terminal disposed thereon, then heating under pressures the substrate and the bonding film thus laminated, thereby bonding the bonding film to the substrate by first weld deposit produced by heating, where the bonding film has a third through-hole, and the first fusible metal connection and the second fusible metal connection are exposed inside the third through-hole;

(d) disposing a fusible metal between the first fusible metal connection and the second fusible metal connection;

(e) disposing a cover film to cover the fusible metal and the bonding film, then heating the cover film and the bonding film positioned around the fusible metal except the zone where the fusible metal is disposed, thereby bonding the bonding film to the cover film by second weld deposit produced by heating; and (f) forming a fuse main body by cutting off weld deposit zones, so as to include a part of the weld deposit zone between the cover film and the bonding film bonded by the second weld deposit, where the fuse main body includes a rise portion and the weld deposit zone, and the fusible metal is located in the rise portion.

By the above configuration, a thermal fuse reduced in size and thickness can be obtained. Further, it is possible to obtain a thermal fuse and battery pack which ensure excellent reliability, high quality and low cost, with power less consumed by the wiring in the battery body, even after being reduced in size.

Figure 1:
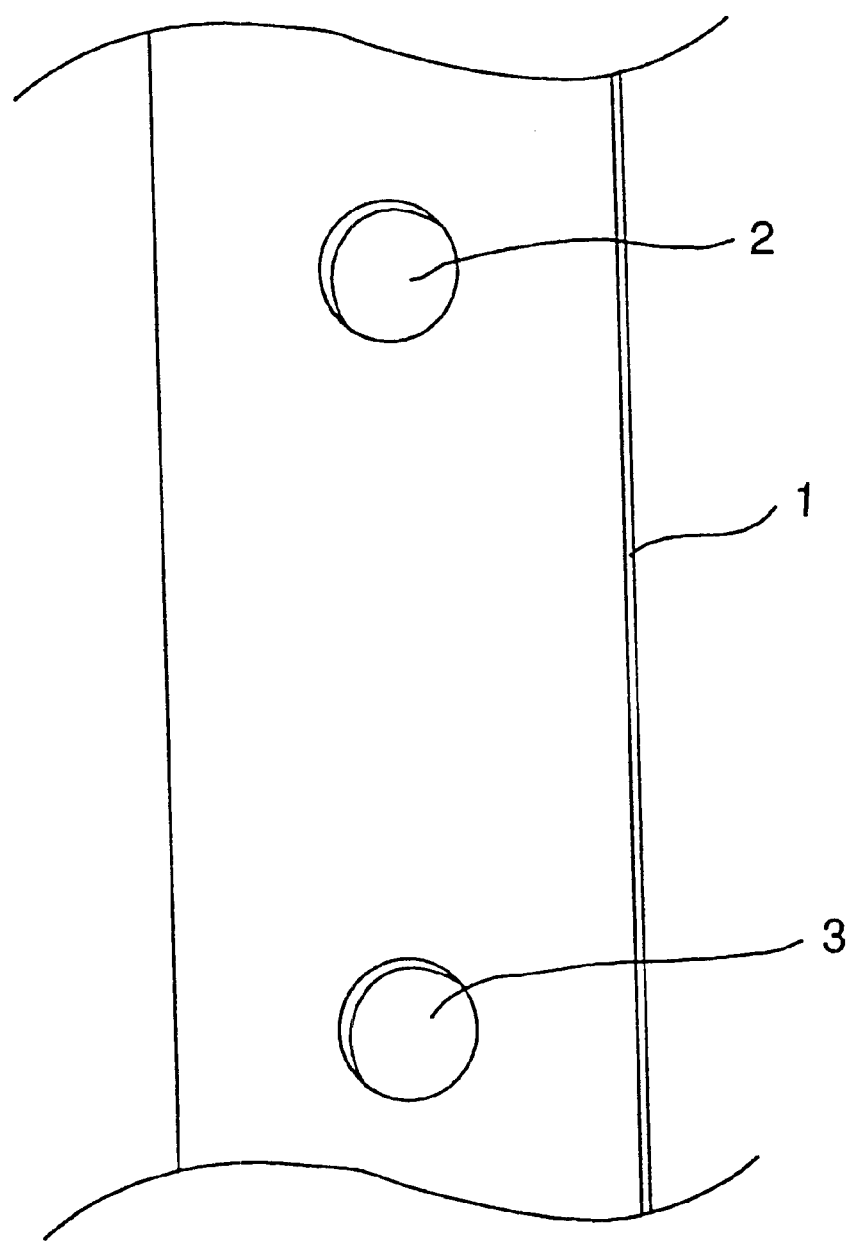
FIG. 1 shows a process of manufacturing a thermal fuse in one embodiment of the present invention.

| Description of the Reference Numerals | |
| --- | --- |
| 1 | Substrate film (substrate) |
| 2, 3 | First through-hole |
| 11, 12 | Second through-hole |
| 13 | Third through-hole |
| 19, 20 | Through-hole |
| 4a, 5a | Good conductor |
| 4. 5 | a pair of terminals |
| 6. 7 | Fusible metal connection |
| 8, 9 | Film connection |
| 10 | Bonding film |
| 14, 15 | Welding flux |
| 16 | Fusible metal |
| 17 | Solid flux |
| 18 | Cover film |
| 21 | Recess |
| 22 | Rise portion |
| 23, 23a, 23b | Weld deposit zone |
| 24, 25 | Weld zone |
| 26 | External electrode |
| 27 | Nickel strip wiring |
| 28 | Protective circuit board |
| 29 | Battery pack body |
| 50 | Fuse main body |
| 100, 200 | Case |
| 101, 102, 201, 202 | Lead |
| 103, 203 | Fusible metal |
| 104, 204 | Flux |
| 105, 205 | Sealing member |

DETAILED DESCRIPTION OF THE INVENTION

A thermal fuse of the present invention comprises a substrate, a pair of terminals disposed on the substrate, a fusible metal connected between the pair of terminals, and a cover disposed so as to cover the fusible metal, for which the characteristics, sizes, materials, etc. of each component element are specified according to the requirements. The word of "the pair of terminals" means the same mean as "paired terminals".

A thermal fuse in one embodiment of the present invention comprises:

(a) a fuse main body having a substrate, a fusible metal and a cover;

(b) paired terminals disposed protruding from the fuse main body, where the paired terminals include a first terminal and a second terminal, one end of the first terminal protrudes from one end of the fuse main body, and one end of the second terminal protrudes from the other end of the fuse main body, wherein the other end of the first terminal includes a first fusible metal connection;

the other end of the second terminal includes a second fusible metal connection;

the fusible metal is disposed between the first terminal and the second terminal;

one end of the fusible metal is connected to the first fusible metal connection, and the other end of the fusible metal is connected to the second fusible metal connection;

the cover is disposed so as to cover the fusible metal, the first fusible metal connection, and the second fusible metal connection; and length L1 of the fuse main body positioned between the first terminal and the second terminal and thickness L3 of the main body are in a relationship as follows:

2.0 mm<L1<8.5 mm 0.4 mm<L3<2.5 mm.

A battery pack in one embodiment of the present invention comprises:

(i) a battery;

(ii) a main boy to accommodate the battery;

(iii) wires led out of the main body and electrically connected to the battery; and (iv) a thermal fuse disposed between the wires so as to contact with the main body, wherein the thermal fuse includes the above mentioned structure.

By the above configuration, a thermal fuse and battery pack reduced in size and thickness can be obtained.

Preferably, the width of the first fusible metal connection is less than the width of the first terminal, and the width of the second fusible metal connection is less than the width of the second terminal.

Preferably, each terminal of the first terminal and the second terminal ranges from 0.08 mm to 0.25 mm in thickness.

Preferably, the fuse main body further comprises a bonding film disposed between the substrate and the cover, and the bonding film has a third through-hole, while the fusible metal, the first fusible metal connection and the second fusible metal connection are located in the third through-hole.

Preferably, the bonding film is formed of thermoplastic;

the first film bonding portion and the second film bonding portion have surfaces rougher than the other surfaces of the first terminal and the second terminal; and the surfaces of the first film bonding portion and the second film bonding portion are bonded to the bonding film by thermo-deposition of the bonding film.

By this configuration, the thermal fuse may be reduced in size and thickness. Further, even when the terminal portion and substrate are reduced in bonding area, it is possible to maintain the bonding strength of the terminal portion and substrate. In addition, by regulating the thickness of the terminal portion, the wiring can be prevented from increasing in resistance. Further, the characteristic improvement and cost reduction of the thermal fuse may be realized. Also, the manufacturing method is simplified. Moreover, the difference in width between the substrate and the terminal portion can be minimized. As a result, the fuse main body can be reduced in size.

Preferably, each terminal of the first terminal and the second terminal ranges from $3 \times 10^{10}$ Pa to $8 \times 10^{10}$ Pa in Young's modulus, and from $4 \times 10^8$ Pa to $6 \times 10^8$ Pa in tensile strength.

By this configuration, the strength of the terminal portion can be maintained even with the thermal fuse reduced in size and thickness. Accordingly, it is possible to prevent terminal bending during the terminal handling job in the manufacturing process or during transportation. Consequently, the generation probability of defective products is minimized. Further, in the operation of bending the terminal portion, disconnection of the terminal portion can be prevented from occurrence. As a result, the productivity will be improved.

Preferably, each terminal of the first terminal and the second terminal includes a good conductor disposed in the zone protruded from the fuse main body.

Preferably, each terminal of the first terminal and the second terminal is made from at least one of nickel and nickel alloy, and the good conductor has electric resistibility in a range from $1.4 \times 10^{-8}$ Ω·m to $5 \times 10^{-8}$ Ω·m.

By this configuration, even with the thermal fuse reduced in size and thickness and with the terminal portion reduced in size, the electric resistance of the terminal portion can be decreased, thereby reducing the power consumption of the thermal fuse itself. Further, the heat transfer will be improved since the good conductor is of low electric resistance. Accordingly, the thermal response is also improved.

Preferably, the side surface of the fuse main body is sealed by the fusion zone formed due to melting of the bonding film.

Still preferably, when the width of the fusion zone is T1, and the thickness is T2, there should be a relationship as follows:

0.9<T1/T2<4.0

By this configuration, even with the thermal fuse reduced in size and thickness, the thermal fuse is completely sealed. As a result, intrusion of water into fusible metal portions can be prevented. Further, the weather resistance will be improved.

Preferably, when the theoretical density of the fusible metal is D1 and the measured density of the fusible metal after machining is D2, then the relationship between the two is D2/D1>0.98.

By this configuration, even when the thermal fuse is reduced in size and thickness, while the fusible metal and the terminal portion are reduced in bonding area, defective welding will be lessened with respect to the fusible metal and terminal portion. Further, the productivity is improved and a low-cost, high-quality thermal fuse can be obtained.

Preferably, the fuse main body further includes flux disposed close to or in contact with the fusible metal.

Still preferably, the flux contains rosin as main component, and the rosin contains 50 wt % to 90 wt % of abietic acid and 10 wt % to 50 wt % of dehydroabietic acid, and the flux is colored with visible rays transmitted.

By this configuration, even with the thermal fuse reduced in size and thickness, variation in fusing characteristic of the fusible metal can be restrained. Further, color recognition can be made for the yellow color of the flux, and it becomes possible to make the quantitative recognition by automatic image checking. As a result, a highly reliable, high-quality thermal fuse can be obtained.

Preferably, the rosin further contains alcohol.

By this configuration, variation in fusing characteristic of the fusible metal may be further restrained.

Preferably, the substrate and the cover are formed of thermoplastic resin mainly containing at least one of polyethylene terephthalate and polyethylene naphthalate.

By this configuration, the thermal fuse may ensure excellent heat resistance even when reduced in size and thickness.

Preferably, each of the substrate and the cover is made of thermoplastic resin; the fuse main body includes a weld deposit zone and a rise portion; the weld deposit zone is formed by weld deposit of the substrate and the cover; and the rise portion is formed by the fusible metal and the cover which covers the fusible metal.

Still preferably, the boundary portion located between the weld deposit zone and the rise portion is rounded or chamfered to have a curvature of at least 0.1 mm in radius.

Further preferably, the rise portion is generally square in shape, and the boundary portion located between the corner of the rise portion and the weld deposit zone is rounded or chamfered to have a curvature of at least 0.3 mm in radius.

By this configuration, sealing suspension is reduced even when the thermal fuse is reduced in size and thickness. Accordingly, the yield and productivity will be improved.

Preferably, the fuse main body further includes a display section disposed on the surface of the cover. The display section includes ultraviolet hardening ink formed by printing.

Still preferably, the display section ranges from 1 $\mu$m to 5 $\mu$m in thickness.

By this configuration, the display may be precisely given for a long period of time even with the thermal fuse is reduced in size and thickness and with the display section decreased in display area.

A battery pack in one embodiment of the present invention comprises:

(i) a battery;

(ii) a main boy to accommodate the battery;

(iii) wires led out of the main body and electrically connected to the battery; and (iv) a thermal fuse disposed between the wires so as to contact with the main body, wherein the thermal fuse includes the above component elements.

By this configuration, even when a battery pack is reduced in thickness, for example, to 2.5 mm to 4 mm, the battery pack obtained may ensure the characteristics and advantages as described above, which is able to reliably prevent overheating.

Exemplary Embodiment

With respect to a thermal fuse and battery pack in an exemplary embodiment of the present invention, the manufacturing process and the configuration will be described with reference to the drawings.

As shown in FIG. 1, first, a strip or plate substrate film 1 is prepared as a substrate. First through-holes 2, 3 are formed in the substrate film 1. The first through-holes 2, 3 are formed for the purpose of positioning in relation to another film laminated onto the substrate film 1 in a process described later. Particularly, since the substrate film 1 is a strip substrate, it is possible to arrange a plurality of paired terminals as described later. Accordingly, the productivity will be greatly improved.

In case no positioning is needed, the first through-holes 2,3 are not to be formed.

Preferably, the substrate film 1 has an insulation. As the substrate film, a resin or ceramic substrate or a metallic plate having an insulated surface is employed. Particularly, it is preferable to use a resin film as the substrate film, and thereby, the workability as well as the productivity will be improved,.

Specifically, the material used for the substrate film 1 is resin (preferably thermoplastic resin) mainly containing at least one of PET (polyethylene terephthalate), PEN (polyethylene naphthalate), ABS resin, SAN resin, polysanphone resin, polycarbonate resin, Noryl, vinyl chloride resin, polyethylene resin, polyester resin, polypropylene resin, polyamide resin, PPS resin, polyacetal, fluorinated resin, polyester.

As the substrate film 1, a uni-structural substrate film or laminated film with different sheet materials laminated is employed. As the laminated film, for example, a laminated film of PET (polyethylene terephathalate) film and PEN (polyethylene naphthalate) is employed. Such laminated film ensures excellent mechanical strength. The strength of the substrate film 1 itself is improved, thereby enhancing the mechanical strength of the film. Further, since a PEN sheet is employed, the film is improved in heat resistance, and consequently, a thermal fuse usable at temperatures higher than 130° C. can be obtained. And, when a laminated film is used as the substrate film 1, the film used is a laminated film that is a combination of films having the desired characteristics with respect to heat resistance, mechanical strength, moisture resistance, water resistance, and adhesion.

Also, for the shape of the substrate film 1, a substrate film having an optional shape such as a disk or oval shape is employed.

Figure 2:
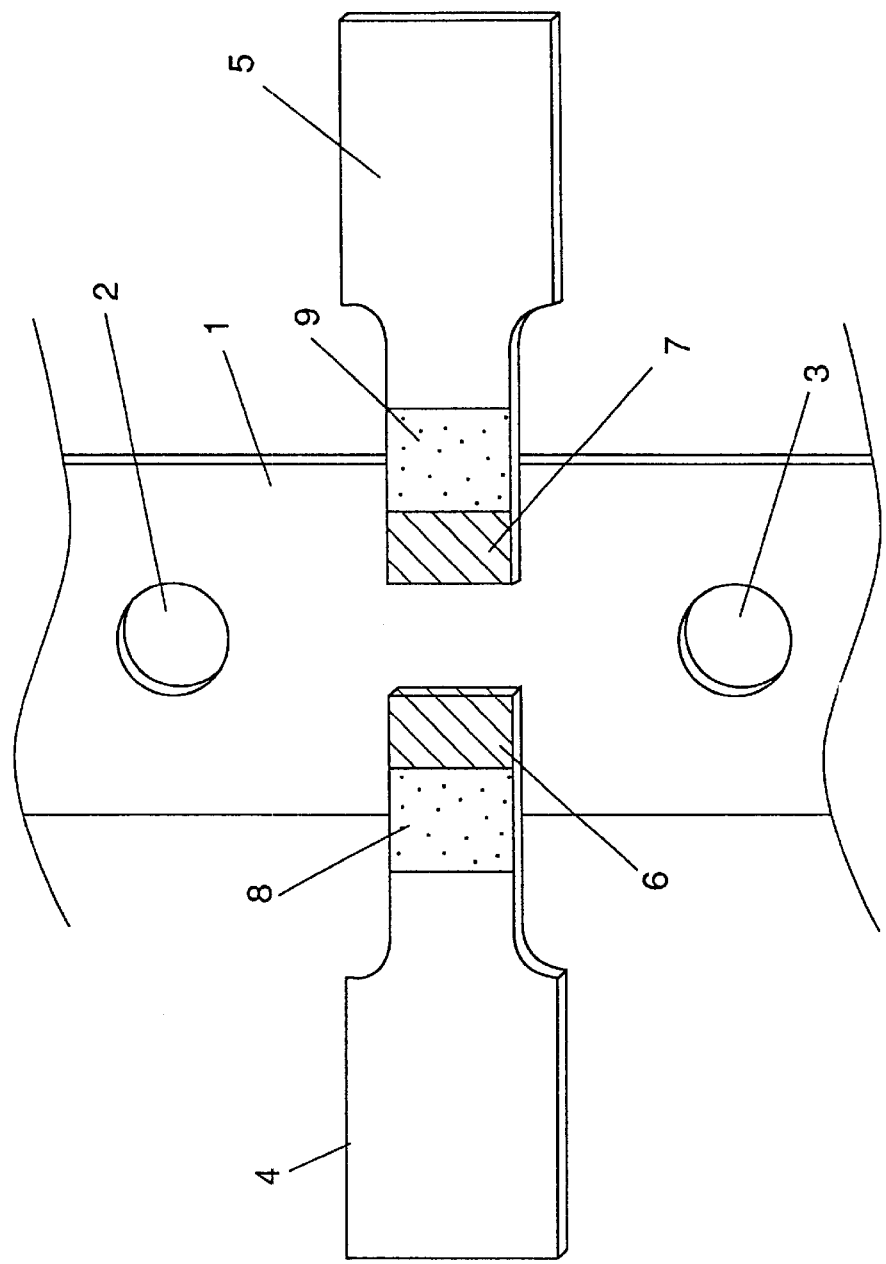
FIG. 2 shows a process of manufacturing a thermal fuse in one embodiment of the present invention.

As shown in FIG. 2, paired terminals 4, 5 having a first terminal 4 and a second terminal 5 are disposed on the substrate 1 in such manner that the paired terminals are opposed and non-contacting to each other between first through-holes 2, 3.

The ends of the terminals 4, 5 are less in width than the other portions. This enables the reduction in size of the element itself. Also, for the shape of the terminals 4, 5, it is possible to use a plate, bar or wire shape terminal. Particularly, a plate shape is preferable for a terminal block, and this configuration improves the productivity and characteristics.

Specifically, conductive material is used as the component material for terminals 4, 5, and a metallic material is preferable in particular. Especially, conductive material using a metallic material ensures excellent strength and characteristics. As the metallic material, a single metal such as nickel, iron, copper, and silver, or an alloy of these, or a metal with other elements added to such single metal, or an alloy with other elements added to such alloy is employed.

The terminals 4, 5 are preferable to contain nickel by 98% at least. The electric resistibility of this material is as low as $8 \times 10^{-8}$ $\Omega \cdot$m to $12 \times 10^{-8}$ $\Omega \cdot$m. Accordingly, the reliability of the terminals will be greatly enhanced in terms of corrosion resistance and the like.

The terminals 4, 5 are preferable to contain copper by 90% to 99.9%. By this configuration, the electric resistibility of the terminals 4, 5 is $4 \times 10^{-8}$ $\Omega \cdot$m to $8 \times 10^{-8}$ $\Omega \cdot$m. Further, the terminals using copper-containing alloy has excellent heat conductivity. Accordingly, due to thermal conduction by electrons, a thermal fuse using copper-containing alloy is more excellent in thermal response as compared with thermal fuses made by using nickel and nickel alloy.

Preferably, the thickness of terminal 4, 5 itself ranges from 0.08 mm to 0.25 mm. By this configuration, the thermal fuse is improved in characteristics and becomes easier to handle. In case the thickness of terminal 4, 5 itself is less than 0.08 mm, the electric resistance of the terminal is increased, and further, its mechanical strength is lowered. Therefore, there arises a problem of bending, for example, when the thermal fuse is handled in the manufacturing process. Also, in case the terminal 4, 5 is thicker than 0.25 mm, the thermal fuse itself becomes thicker, and consequently, the size of the thermal fuse becomes a little larger.

Preferably, the width of terminal 4, 5 itself is greater than the widths of film bonding portion 8, 9 and fusible metal connection 6, 7. By this configuration, the resistance of the terminal portion can be controlled by regulating the width of the terminal. That is, the resistance of the terminal portion can be decreased by increasing the width of terminal 4, 5 itself. The width (case width) after cutting off weld deposit zone 23a, 23b shown in FIG. 12 can be made equal to the width of terminal 4, 5 by making the widths of the film bonding portion 8, 9 and the fusible metal connection 6, 7 less than the width of terminal 4, 5. Accordingly, the resistance of the wiring is not much increased even with the thermal fuse reduced in size. As a result, the power consumption is decreased. Preferably, terminals having the intended width are manufactured by cutting in a press machining process. In this way, it is possible to efficiently manufacture desired terminals reduced in width.

Preferably, the Young's modulus of terminals 4, 5 is $3 \times 10^{10}$ P to $8 \times 10^{10}$ Pa. The tensile strength of terminals 4, 5 is $4 \times 10^8$ Pa to $6 \times 10^8$ Pa. By this configuration, generation of terminal bending can be prevented during the manufacture or transportation of the thermal fuse. Further, it becomes easier to bend the terminals. Also, it is possible to prevent generation of breaking trouble in the terminal bending process.

When the Young's modulus of terminals 4, 5 is less than $3 \times 10^{10}$ Pa, the terminal becomes easier to bend. For example, electrically connected portions like the ends of terminals 4, 5, which should not bend, are liable to become irregular, making it difficult to connect the portions by welding.

When the Young's modulus is more than $8 \times 10^{10}$ Pa, the terminal becomes easier to break or hard to bend. For example, a portion like the middle portion of terminal 4 shown in FIG. 15, which should bend, becomes hard to bend or breaks to be disconnected.

When the tensile strength of terminals 4, 5 is less than $4 \times 10^8$ Pa, there arises a problem of being easier to bend. When the tensile strength is higher than $6 \times 10^8$ Pa, a portion like the middle portion of terminal 4 shown in FIG. 15, which should bend, becomes hard to bend or breaks to be disconnected.

The Young's modulus, tensile strength, terminal bending test and drop test data are shown in Table 1.

Figure 18:
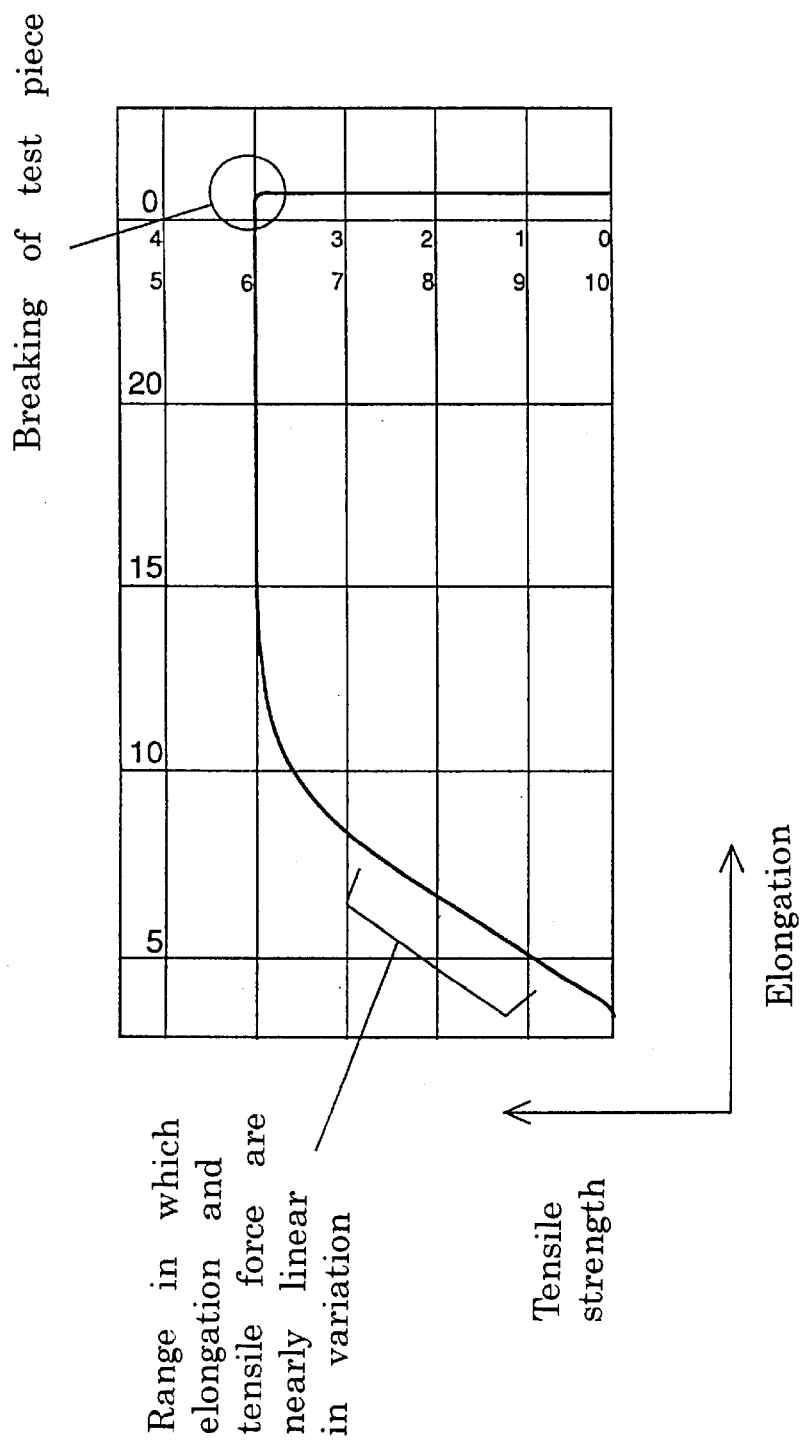
FIG. 18 is a graph showing a tensile strength—expansion curve in the tensile strength test of a thermal fuse in one embodiment of the present invention.

As for the measurement of Young's modulus and tensile strength, Shimadzu Autograph AGS-500 of Shimadzu Sensakusho Ltd. was employed to measure the tensile strength of the material. The tensile strength was measured at a tensile speed of 1 mm/min. to find out the relationship between elongation of the test piece and tensile force. The Young's modulus was calculated from the range in which the elongation and tensile force are nearly linear in variation. The tensile strength was calculated from the maximum force required until breaking of the test piece. The relationship between tensile force and elongation is shown in FIG. 18.

The terminal bending test was performed by repeatedly bending and bending back the terminal at 90° in the same direction, using a jig having an angle of 90°. Repeating such bending and bending back operations until breaking of the terminal, the frequency of bending and bending back operations was measured. When the frequency of bending and bending back operations is less than two times, it is judged to be "x". When the frequency is two times, it is judged to be "Δ". When the frequency is three times or more, it is judged to be "○".

The drop test was performed by the following method. Test pieces of 3 mm×20 mm in size are prepared by machining the material to be tested. The test pieces are put into a polyethylene bag, and the polyethylene bag containing 50 g of test pieces is dropped from a 1 m height onto a concrete surface by six times. Then the occurrence rate of breaking or bending was measured with respect to the material. When breaking or bending takes place, it is judged to be "x". When no breaking or bending takes place, it is judged to be "○".

TABLE 1

Young's modulus and tensile strength of terminals, terminal bending test and drop test.

| No. | Materials | Tensile test piece sizes | | | Young's modulus in tensile test [$\times 10^{10}$Pa] | Tensile strength [$\times 10^8$Pa] | Terminal bending test | | Drop test | |
|---|---|---|---|---|---|---|---|---|---|---|
| | | Width [mm] | Thickness [mm] | Length [mm] | | | Bending frequency | Judgment | Terminal bending | Judgment |
| No. 1 | Ni alloy | 12.00 | 0.15 | 40.0 | 4.8 | 4.2 | 10 | ○ | No | ○ |
| No. 2 | Ni alloy | 3.00 | 0.10 | 40.0 | 7.2 | 4.3 | 8 | ○ | No | ○ |
| No. 3 | Ni alloy | 3.00 | 0.15 | 40.0 | 2.7 | 3.7 | 15 | ○ | Yes | x |
| No. 4 | Ni alloy | 3.10 | 0.15 | 40.0 | 8.4 | 7.0 | 2 | Δ | No | ○ |
| No. 5 | Ni alloy | 3.00 | 0.10 | 40.0 | 8.3 | 6.9 | 1 | x | No | ○ |
| No. 6 | Ni alloy | 3.00 | 0.10 | 40.0 | 7.2 | 5.0 | 7 | ○ | No | ○ |
| No. 7 | Ni alloy | 3.40 | 0.15 | 40.0 | 6.5 | 4.3 | 9 | ○ | No | ○ |
| No. 8 | Ni alloy | 2.90 | 0.15 | 40.0 | 5.8 | 5.3 | 9 | ○ | No | ○ |

TABLE 1-continued

Young's modulus and tensile strength of
terminals, terminal bending test and drop test.

| | | Tensile test piece sizes | | | Young's modulus in | | Terminal bending test | | Drop test | |
|---|---|---|---|---|---|---|---|---|---|---|
| No. | Materials | Width [mm] | Thickness [mm] | Length [mm] | tensile test [×10$^{10}$Pa] | Tensile strength [×10$^8$Pa] | Bending frequency | Judgment | Terminal bending | Judgment |
| No. 9 | Cu alloy | 7.70 | 0.15 | 40.0 | 4.3 | 5.2 | 11 | ○ | No | ○ |
| No. 10 | Cu alloy | 12.00 | 0.15 | 40.0 | 3.5 | 5.4 | 12 | ○ | No | ○ |

Table 1 reveals the following. That is, when the Young's modulus of the terminal 4, 5 is in a range from 3×10$^{10}$ Pa to 8×10$^{10}$ Pa, and the tensile strength of same is in a range from 4×10$^8$ Pa to 6×10$^8$ Pa, excellent characteristics are obtained in the bending test. That is, when the terminal material is in the above ranges with respect to Young's modulus and tensile strength, generation of terminal bending can be prevented in the manufacturing process or during transportation of the thermal fuses. In addition, the operation to bend terminals may be facilitated. Further, it is possible to prevent generation of breaking trouble or the like in terminal bending.

As described above, in case the substrate film 1 has a laminated structure of a PET sheet and PEN sheet, it is preferable to mount terminals 4, 5 on the PET sheet side.

Fusible metal connections 6, 7 are disposed in a zone where the paired terminals 4. 5 are opposed to each other. The zone where the paired terminals 4, 5 are opposed to each other stands for the surf ace where each of the terminals 4, 5 is opposing to the substrate film 1, or for the terminal surface located on the opposite side of the substrate film 1. Since the fusible metal connections 6, 7 are disposed, the weldability between the terminal and fusible metal is improved as described later. Also, in the present embodiment, the fusible metal connection 6, 7 is disposed on the main surface of only one of the terminals 4, 5. However, it is also possible to dispose the fusible metal connections 6, 7 respectively on the two main surfaces of the terminals 4, 5. Also usable is a configuration such that the fusible metal connections 6, 7 are respectively disposed on the entire peripheries of the ends of terminals 4, 5. The fusible metal connections 6, 7 are manufactured by using film forming techniques such as metal-plating, spattering, and evaporation processes, or by a metallic sheet sticking process or the like. As the materials for fusible metal connections 6, 7, it is preferable to use a single material selected from the group consisting of welding materials such as gold, silver, copper, tin, lead, bismuth, indium, gallium, and palladium, or a material with other elements added to the single material, or an alloy of metals selected from the group consisting of the welding materials, or an alloy with other elements added to the alloy.

Figure 16:
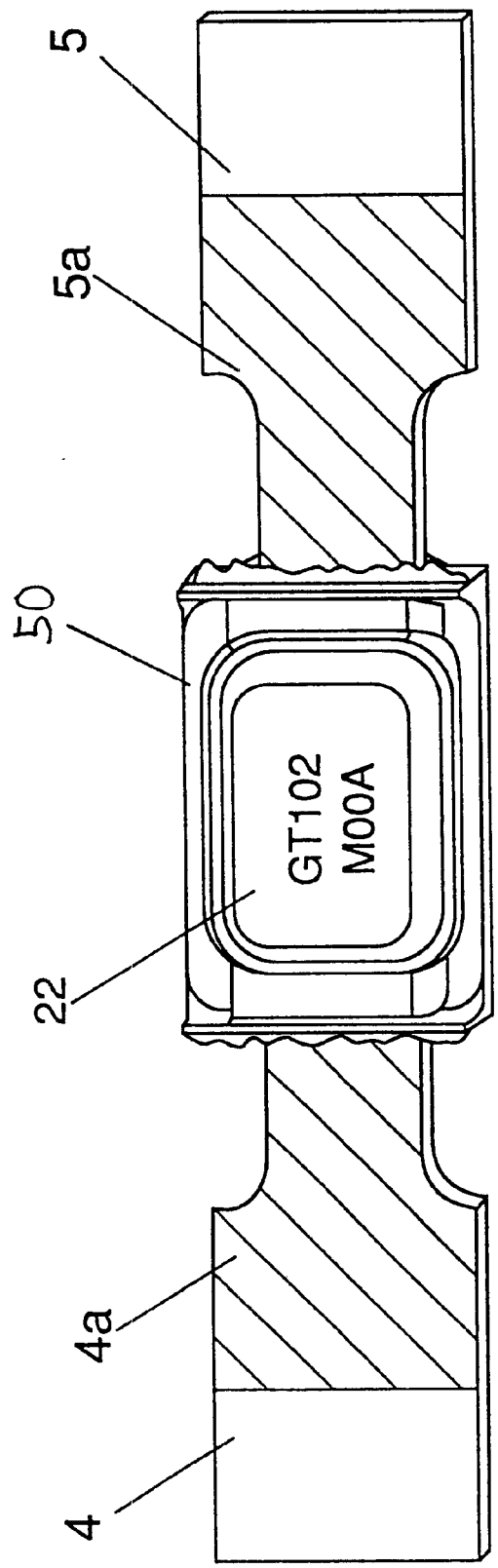
FIG. 16 is a perspective view of a thermal fuse in another embodiment of the present invention.

Preferably, when the terminals 4, 5 are manufactured by using nickel or nickel ally, good conductor 4a, 5a is disposed on at least one of the fusible metal connections 6, 7, sealing portions 8, 9, and terminals 4, 5 shown in FIG. 16. In this case, the electric resistibility of the metal ranges from 1.4×10$^{-8}$ Ω·m to 5×10$^{-8}$ Ω·m. By this configuration, the thermal response is improved due to thermal conduction by electrons. Further, it becomes easier to perform electric welding to wires or patterns containing nickel.

Table 2 shows the relationship between terminal materials and terminal fusing temperature characteristics (thermal response).

A fusible metal whose fusing temperature is 89±2° at a temperature rise rate of 1° C./min. was used as a thermal fuse. Polyethylene phthalate (PET) of 0.125 mm thick was employed as substrate film 1, bonding film 10, and cover film 18. Nickel terminals containing nickel were used as terminals 4. 5.

The material for nickel terminals is nickel alloy consisting of Ni+[Co (99.3 wt %), C (0.1 wt %), Si (0.1 wt %), Mn (0.1 wt %), Mg (0.1 wt %), Fe (0.2 wt %), Cu (0.1 wt %)]. The electric resistibility of the nickel alloy is 11.25×10$^{-8}$ Ω·m.

Using a sample with a heater installed at the terminal position 8 mm from the center of the thermal fuse, the heater temperature is raised at a rate of about 10° C./min., and then the heater temperature at which the thermal fuse blows is the terminal fusing temperature. With the terminal fusing temperature, causing no metal to be formed, as a standard temperature, when the terminal is fused at a temperature 5° at least lower than the standard temperature, it is judged to be "○"; when the terminal fusing temperature is within ±5° as compared with the standard temperature, it is judged to be "Δ"; and when the terminal fusing temperature is 5° or more higher than the standard temperature, it is judged to be "x".

TABLE 2

Relationship between terminal materials and terminal
fusing temperature characteristics (thermal response)

| | Ni terminal sizes | | | Metals formed | | | Terminal | |
|---|---|---|---|---|---|---|---|---|
| No. | Width [mm] | Thickness [mm] | Length [mm] | Materials | Electric resistibility [×10$^{-8}$ Ω·m] | Plating thickness [μm] | fusing temperature [° C.] | Judgment |
| No. 1 | 3 | 0.15 | 8 | None | — | — | 134 | Standard |
| No. 2 | 3 | 0.15 | 8 | Copper | 1.72 | 3 | 128 | ○ |
| No. 3 | 3 | 0.15 | 8 | Copper | 1.72 | 5 | 122 | ○ |

TABLE 2-continued

Relationship between terminal materials and terminal fusing temperature characteristics (thermal response)

| | Ni terminal sizes | | | Metals formed | | | Terminal | |
|---|---|---|---|---|---|---|---|---|
| No. | Width [mm] | Thickness [mm] | Length [mm] | Materials | Electric resistibility [×10$^{-8}$ Ω·m] | Plating thickness [μm] | fusing temperature [° C.] | Judgment |
| No. 4 | 3 | 0.15 | 8 | Silver | 1.62 | 5 | 120 | ○ |
| No. 5 | 3 | 0.15 | 8 | Tin | 11.4 | 3 | 136 | Δ |
| No. 6 | 3 | 0.15 | 8 | Nickel | 6.9 | 3 | 133 | Δ |

Table 2 reveals the following. That is, excellent thermal response is obtained when a metal whose electric resistibility ranges from $1.4 \times 10^{-8}$ Ω·m to $5 \times 10^{-8}$ Ω·m is disposed on the surface of nickel terminal. A metal having such electric resistance is copper or silver which may be formed by metal plating.

Table 3 is the data showing the relations of surface roughness, sealing terminal width, twisting resistance test, and 20 mm inter-terminal resistance.

TABLE 3

Surface roughening, sealing terminal width, and twisting resistance test

| | Terminal sizes | | | Case | | | Surface roughening | Sealing terminal sizes | | Twisting resistance test | | 20 mm inter-terminal resistance judgment | General judgment |
|---|---|---|---|---|---|---|---|---|---|---|---|---|---|
| | | | | | | | | | | Fusing temp. judgment | Sealing check judgment | | |
| No. | Width [mm] | Thickness [mm] | Length [mm] | Width [mm] | Thickness [mm] | Length [mm] | | Width [mm] | Length [mm] | | | | |
| No. 1 | 3 | 0.15 | 13 | 3.2 | 0.8 | 5.4 | Yes | 3 | — | ○ | ○ | Standard | Standard |
| No. 2 | 3 | 0.15 | 13 | 3.2 | 0.8 | 5.4 | Yes | 2.4 | 4 | ○ | ○ | ○ | ○ |
| No. 3 | 3 | 0.15 | 13 | 3.2 | 0.8 | 5.4 | Yes | 2 | 4 | ○ | ○ | ○ | ○ |
| No. 4 | 3 | 0.15 | 13 | 3.2 | 0.8 | 5.4 | Yes | 1.8 | 4 | ○ | ○ | ○ | ○ |
| No. 5 | 3 | 0.15 | 13 | 3.2 | 0.8 | 5.4 | Yes | 1.6 | 4 | ○ | ○ | ○ | ○ |
| No. 6 | 3 | 0.15 | 13 | 3.2 | 0.8 | 5.4 | Yes | 1.2 | 4 | ○ | ○ | x | x |
| No. 7 | 3 | 0.15 | 13 | 3.2 | 0.8 | 5.4 | No | 2.4 | 4 | ○ | x | ○ | x |
| No. 8 | 3 | 0.15 | 13 | 3.2 | 0.8 | 5.4 | No | 1.8 | 4 | ○ | x | ○ | x |
| No. 9 | 2 | 0.15 | 13 | 3.2 | 0.8 | 5.4 | Yes | 2 | — | ○ | ○ | x | x |
| No. 10 | 1.5 | 0.15 | 13 | 3.2 | 0.8 | 5.4 | Yes | 1.5 | — | ○ | ○ | x | x |

Film bonding portions 8, 9 are respectively disposed on terminals 4, 5. By this configuration, the bonding strength between the terminal portion and substrate 1, and between the bonding film described later and terminals will be enhanced. Preferably, the film bonding portions 8, 9 have surfaces rougher than the other portions. Thus, the bonding strength between the terminal 4, 5 and the substrate 1, etc. may be increased. Specifically, the surface roughness is preferable to be approximately 5 to 100 μm in average roughness at center line. As a surface roughening method, it is preferable to employ a blast polishing method to roughen the surfaces by spraying fine hard particles, or a polishing method to roughen the surfaces by rotating a grindstone (blade), or a polishing method to roughen the surfaces by a wire brush.

As another method of improving the bonding strength of film bonding portions 8, 9, a bond strengthening layer is formed by applying a coupling agent to the surfaces of film bonding portions 8, 9. As the coupling agent, silicone organic compound or titanium organic compound or the like is employed.

The thermal fuse employed is a fusible metal whose fusing temperature is 89±2° C. at a temperature rise rate of 1° C./min. A laminated film of polyethylene terephthalate (PET) of 0.1 mm thick and polyethylene naphthalate (PEN) of 0.125 mm thick was used for substrate film 1 and cover film 18. The heat resistance of PET is 120° C., and that of PEN is 160° C. Also, PET of 0.125 mm thick was used as bonding film 10. Nickel terminal made of nickel alloy was used for terminals 4, 5. The material for the nickel alloy consists of Ni+[Co (99.3 wt %), C (0.1 wt %), Si (0.1 wt %), Mn (0.1 wt %), Mg (0.1 wt %), Fe (0.2 wt %), Cu (0.1 wt %)]. The electric resistibility of the nickel alloy is $11.25 \times 10^{-8}$ Ω·m. The inter-terminal distance of terminals 4, 5 is 1.7 mm.

The twisting resistance test was conducted by the following method. The terminals 4, 5 were first secured. Subsequently, the terminals 4, 5 were twisted 3 times by 90° forward and backward about the central axis in the lengthwise direction of the thermal fuse. After that, the fusing test was performed. When fusing of the terminal takes place as specified, it is judged to be "○", and when fusing of the terminal does not take place as specified, it is judged to be "x".

In the sealing check test, if flux leakage occurs after terminal fusing in the twisting resistance test, it is judged to be "x", and in case of no flux leakage, it is judged to be "○".

In the 20 mm inter-terminal resistance test, where the 20 mm inter-terminal resistance in using terminals of 3 mm wide and 0.15 mm thick is a standard resistance, it is judged to be "○" when the resistance value measured is within 2 mΩ larger than the standard value, and it is judged to be "x" when the resistance value measured is over 2 mΩ larger than the standard value.

Table 3 reveals the following. Since the surfaces of film bonding portions 8, 9 are rougher than the surfaces of other portions, the bonding strength between the film bonding portion 8, 9 and the substrate film 1, etc. will be increased. Since the film bonding portions 8, 9 and fusible metal connections 6, 7 are less in width than the terminals 4, 5, it is possible to make the width (case width) after cutting off of weld deposit zone 23 identical with the terminal width. Accordingly, even with the thermal fuse reduced in size, the thermal fuse obtained does not cause the wiring to increase in resistance.

Preferably, when the terminals are actually installed on the substrate 1, the terminals are disposed in such manner that at least a part of the film bonding portion 8, 9 is directly opposed to the substrate film 1.

Preferably, the end portions of terminals 4, 5, where fusible metal connections 6, 7 and film bonding portions 8, 9 are located, are thicker than other portions. By this configuration, when the terminals 4, 5 are secured to the substrate film 1 and the bonding film described later, the gaps between each film and terminals 4, 5 can be lessened. Accordingly, the bonding strength between terminal 4, 5 and each film will be enhanced.

Preferably, the terminal corners are rounded by chamfering, thereby preventing generation of burr.

Figure 3:
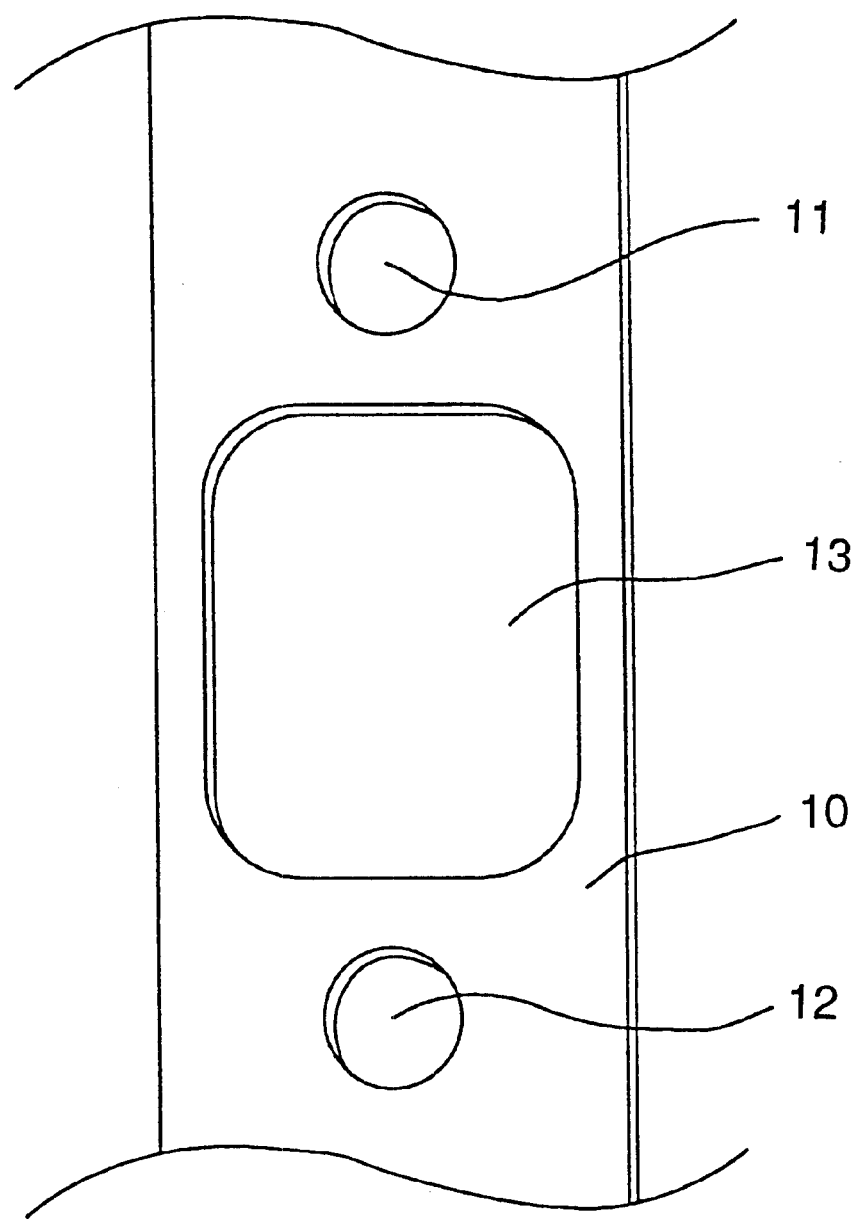
FIG. 3 shows a process of manufacturing a thermal fuse in one embodiment of the present invention.
Figure 4:
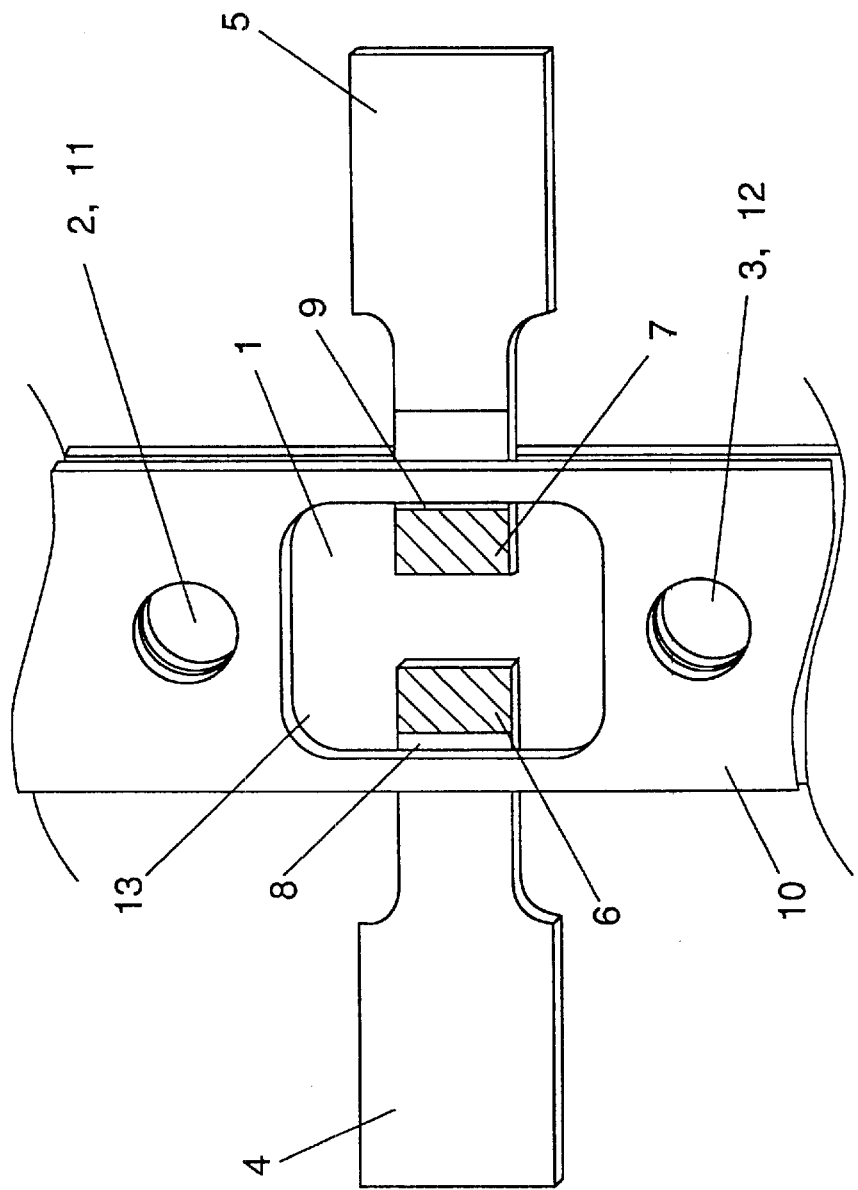
FIG. 4 shows a process of manufacturing a thermal fuse in one embodiment of the present invention.

Next, bonding film 10 as shown in FIG. 3 is placed on the substrate film 1 as shown in FIG. 4. After that, the terminals 4, 5 are sandwiched between the substrate film 1 and the bonding film 10.

As shown in FIG. 3, second through-holes 11, 12 are formed in the bonding film 10. Third through-hole 13 having a round edge is formed between the through-holes 11, 12. The shape of the third through-hole 13 is generally rectangular. The substrate film 1 and bonding film 10 are positioned so that the second through-holes 11, 12 are placed on first through-holes 2, 3 of the substrate film 1.

As shown in FIG. 4, the fusible metal connections 6, 7 of the terminals 4, 5 are exposed from the third through-hole 13. In the present embodiment, both of the fusible metal connection 6, 7 and film bonding portion 8, 9 are exposed from the third through-hole 13, but it is not limited to this configuration. A configuration such that the film bonding portions 8, 9 are exposed from the third through-hole 13 is also usable. Since the film bonding portions 8, 9 are exposed from the third through-hole 13, the bonding film 10 at least will protrude into the third through-hole 13 in the bonding process afterwards. Accordingly, as shown in the present embodiment, it is preferable that a part of the film bonding portions 8, 9 be exposed from the third through-hole 13.

Preferably, the bonding film 10 is made of a material having an insulation. Particularly, thermoplastic resin mainly containing at least one selected from the group consisting of polyethylene terephthalate (PET), polyethylene naphthalate (PEN), ABS resin, SAN resin, polysanfone resin, polycarbonate resin, Noryl, vinyl chloride resin, polyethylene resin, polyester resin, polypropylene resin, polyamide resin, PPS resin, polyacetal, fluorocarbon resin, and polyester is used as the bonding film 10.

Figure 5:
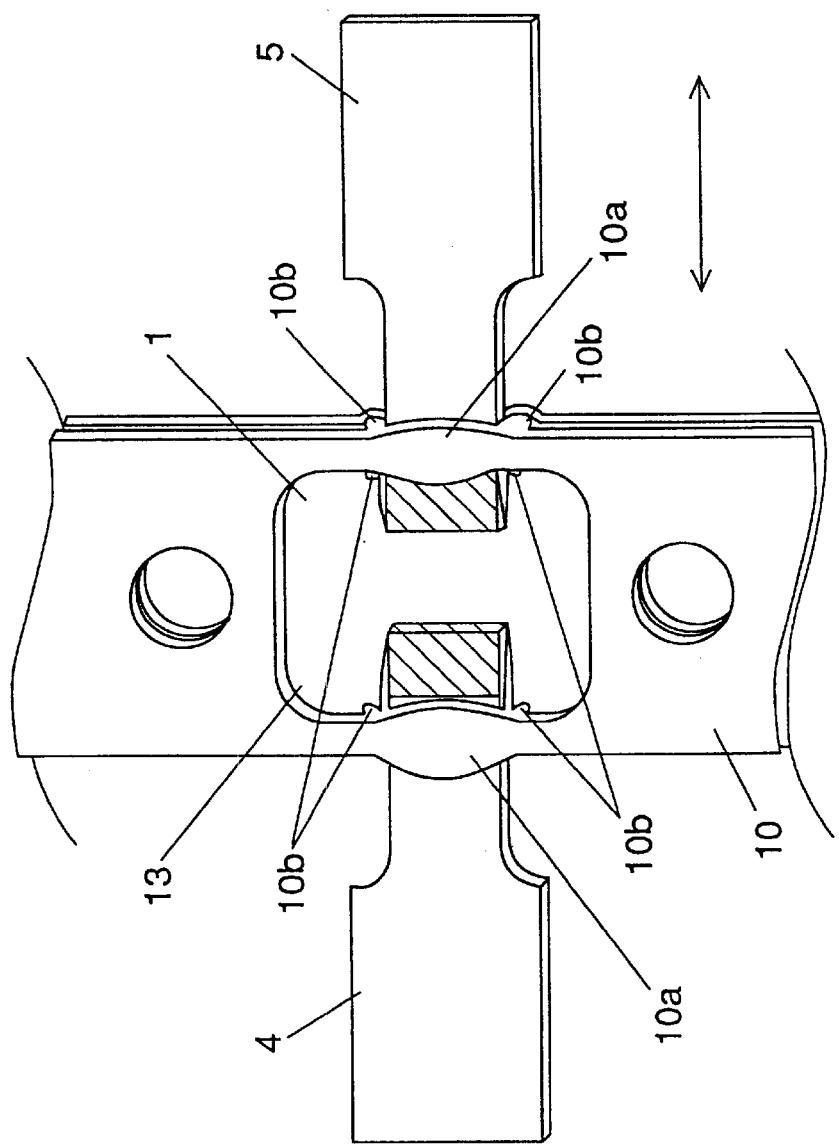
FIG. 5 shows a process of manufacturing a thermal fuse in one embodiment of the present invention.

Next, as shown in FIG. 5, the terminals 4, 5 are secured by the substrate film 1 and bonding film 10. In this case, to secure the terminals, a pressure is first applied thereto from the surface and back sides via the substrate film 1 and bonding film 10 in a direction opposing to each other. Subsequently, a current is applied across the terminals 4, 5, thereby causing the terminals 4, 5 to generate heat to melt the substrate film 1 and bonding film 10. The weld deposit then produced secures the terminals 4, 5 on the substrate film 1 and bonding film 10, and also, the substrate film 1 and bonding film 10 are bonded to each other.

In that case, zone 10a between the through-hole 13 and the side portion of the bonding film 10 becomes wider than other portions due to the heat and pressure applied, and moreover, the zone 10a located above the terminals 4, 5 circularly protrudes in the direction of through-hole 13 (that is, toward the ends of terminals 4, 5). Further, the zone 10a also circularly extends toward the end portion at the opposite side of through-hole 13. Furthermore, the substrate film 1 circularly extends toward the connection to other circuit patterns of terminals 4, 5. In this way, the bonding film 10 and substrate film 1 circularly extend in the lengthwise direction of terminals 4, 5. Thus, the bonding area of the substrate 1 and bonding film 10 as against the terminals 4, 5 may be increased as compared with the area before heating. As a result, the bonding strength of terminals 4, 5 will be enhanced.

At the portion where the terminals 4, 5 and the bonding film 10 are directly opposing to each other, the terminals 4, 5 and the bonding film 10 are bonded to each other by the hot melt of bonding film 10. Some of the hot melt of bonding film 10 flows out in the lengthwise direction of terminals 4, 5 due to the pressure applied separately from the circularly extending zone 10a. The outflow of such hot melt improves the effect of sealing the gaps created between the exterior, through-hole 13 and substrate film 1.

Similarly, at the portion where the substrate film 1 and terminals 4, 5 are directly opposing to each other, some of the hot melt of substrate film 1 melted by heat serves to bond the substrate film 1 to the terminals 4, 5, while some of the hot melt of the substrate film flows out in the lengthwise direction of terminals 4, 5. Thus, the sealing effect will be enhanced.

Also, at the side portions of terminals 4, 5, both of the substrate film 1 and bonding film 10 are melted by the heat generated due to self-heating of the terminals 4, 5, and the mixture of the melts fills up the gaps between the substrate film 1 and bonding film 10 at the sides of terminals 4, 5. Further, the mixed melt flows inwardly in the direction of through-hole 13 and outwardly in the opposite direction to form circular protrusions 10b. Thus, the sealing effect will be further enhanced.

Figure 6:
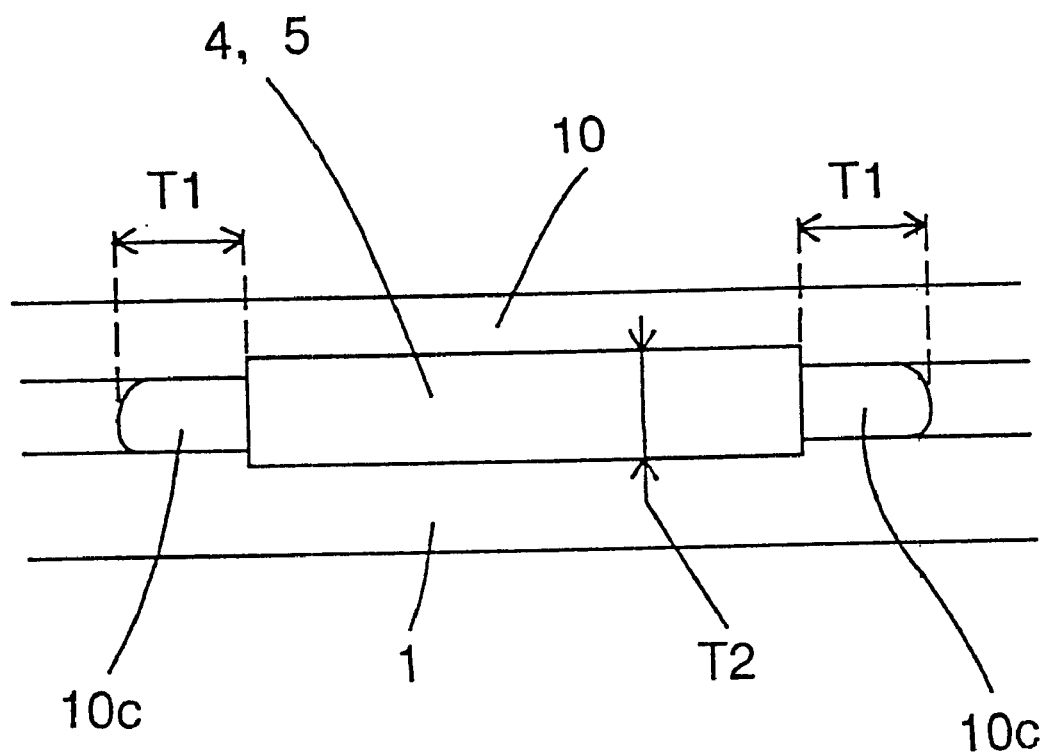
FIG. 6 shows a process of manufacturing a thermal fuse in one embodiment of the present invention.

FIG. 6 is a sectional view of the substrate film 1 and bonding film 10 in boding relationship. The thickness of terminals 4, 5 is T2. The length (deposition size) in the sidewise direction of terminals 4, 5 of melt 10c of both substrate film 1 and bonding film melted by heat is T1. In this case, the heating value and pressure or the like of terminals 4, 5 are adjusted so as to satisfy the relationship of $0.9 < T1/T2 < 4.0$. When T1/T2 is 0.9 or less, the sealing effect is a little lower at the side portions of terminals 4, 5. When T1/T2 is over 4.0, it is necessary to increase the self-heating of terminals 4, 5 or to apply a higher pressure. Therefore, it gives rise to generation of damage to the members or causes the productivity improving effect to be lessened.

Table 4 shows the size of deposition and evaluation of sealing

TABLE 4

Size of deposition and evaluation of sealing

| | Terminal sizes | | | Case | | | Deposition sizes | | |
| --- | --- | --- | --- | --- | --- | --- | --- | --- | --- |
| No. | Width [mm] | T2 [mm] | Length [mm] | Width [mm] | Thickness [mm] | Length [mm] | T1 [mm] | T1/T2 | Sealing evaluation |
| No. 1 | 3 | 0.15 | 13 | 3.2 | 0.8 | 5.4 | 0 | 0.0 | x |
| No. 2 | 3 | 0.15 | 13 | 3.2 | 0.8 | 5.4 | 0.05 | 0.3 | x |
| No. 3 | 3 | 0.15 | 13 | 3.2 | 0.8 | 5.4 | 0.1 | 0.7 | x |
| No. 4 | 3 | 0.15 | 13 | 3.2 | 0.8 | 5.4 | 0.15 | 1.0 | ○ |
| No. 5 | 3 | 0.15 | 13 | 3.2 | 0.8 | 5.4 | 0.2 | 1.3 | ○ |
| No. 6 | 3 | 0.15 | 13 | 3.2 | 0.8 | 5.4 | 0.3 | 2.0 | ○ |
| No. 7 | 3 | 0.15 | 13 | 3.2 | 0.8 | 5.4 | 0.5 | 3.3 | ○ |
| No. 8 | 3 | 0.15 | 13 | 3.2 | 0.8 | 5.4 | 0.7 | 4.7 | x |
| No. 9 | 3 | 0.15 | 13 | 3.2 | 0.8 | 5.4 | 1.0 | 6.7 | x |

The value of deposition size T1 can be adjusted by regulating the current, welding time, and pressure. The terminals were prepared by nickel alloy of 3 mm in width and 0.15 mm (T2) in thickness. Polyethylene terephthalate (PET) was used as the substrate film 1, bonding film 10, and cover film 18. The substrate film 1, bonding film 10, and cover film 18 were bonded by a supersonic welding process with an annular projection.

In the evaluation of sealing, as shown in FIG. 16, a finished thermal fuse was left in an atmosphere of 150° C. for 10 minutes. Flux leakage was observed in that condition. When flux 17 is not leaking, it is judged to be "○", and in case the flux is leaking, it is judged to be "x".

Table 4 reveals the following. That is, by adjusting the heating value and pressure of terminals 4, 5 so as to satisfy the relationship of 0.9<T1/T2<4, it is possible to obtain a thermal fuse ensuring excellent sealing effect.

Figure 7:
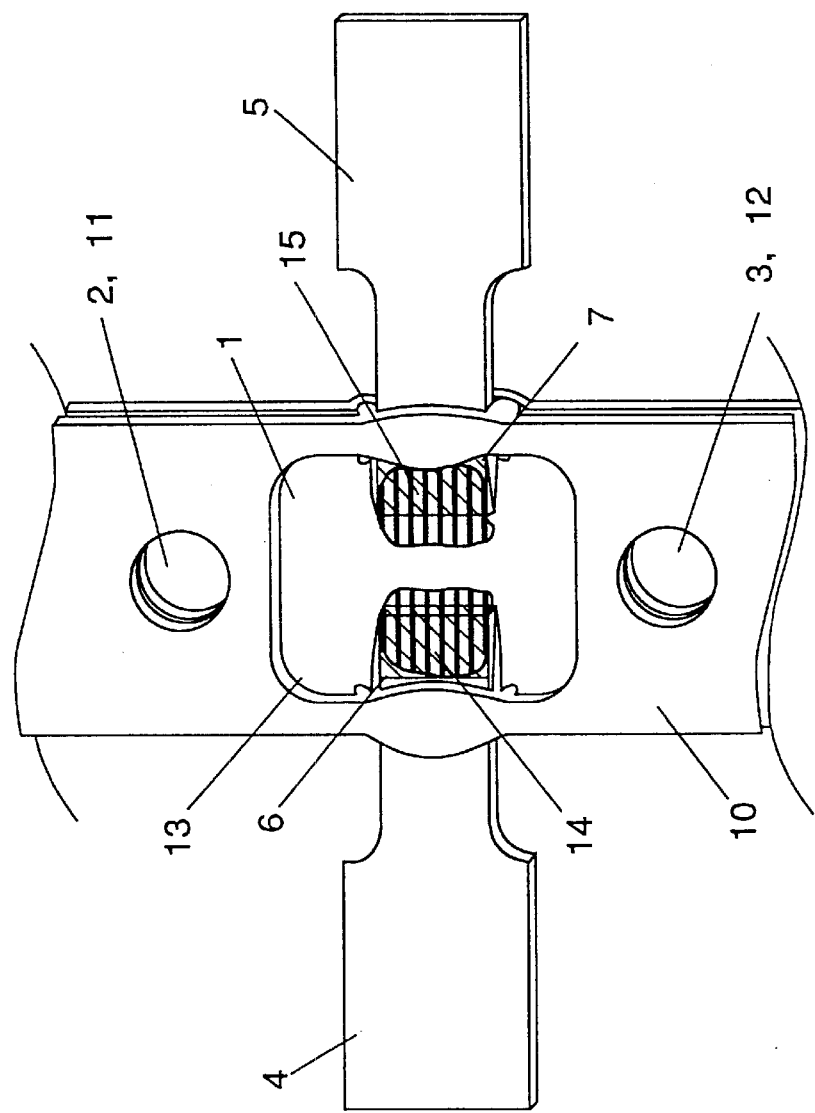
FIG. 7 shows a process of manufacturing a thermal fuse in one embodiment of the present invention.

Next, as shown in FIG. 7, welding flux 14, 15 is disposed on the end portions (fusible metal connections 6, 7) of terminals 4, 5 exposed inside the through-hole 13. The welding flux 14, 15 is disposed in order to properly weld the terminals 4, 5 to the fusible metal mentioned later. In the present embodiment, the welding flux 14 and 15 are separately disposed, but it is not limited to this configuration. It is also possible to dispose both of the flux integrally.

As a specific composition of the welding flux 14, 15, for example, flux prepared by dissolving 15 wt % to 60 wt % of rosin in an alcoholic solvent is used. As the rosin composition, rosin containing 50 wt % to 90 wt % of abietic acid and 10 wt % to 50 wt % of dehydroabietic acid is used. By using welding flux 14, 15 having the above composition, the welding strength between the fusible metal and terminals 4, 5 can be increased. Further, it enables alcohol to remain close to the fusible metal.

Since alcohol stays near the fusible metal, the solid flux described later can also contain a small amount of alcohol. Accordingly, at a temperature higher than the boiling point of alcohol, the activity of the solid flux described later will be improved. As a result, the function as a thermal fuse is stabilized.

Figure 8:
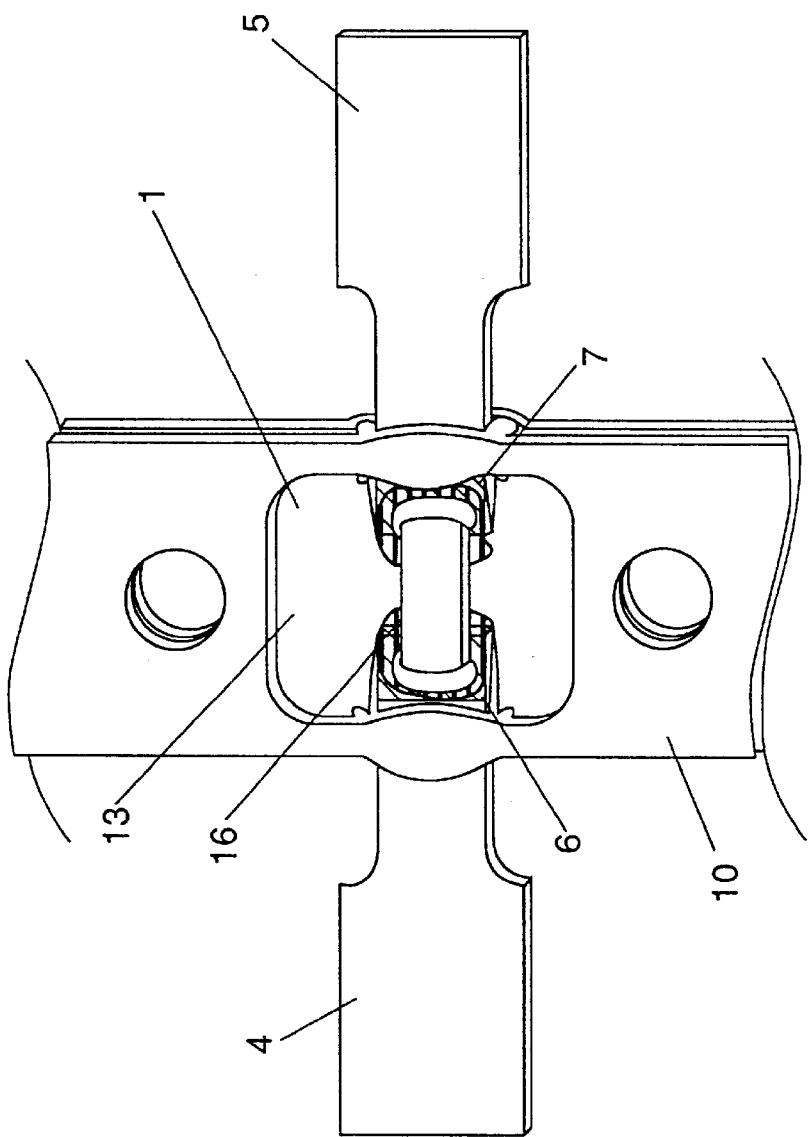
FIG. 8 shows a process of manufacturing a thermal fuse in one embodiment of the present invention.

Next, as shown in FIG. 8, one or a plurality of fusible metal 16 formed of low-fusion-point fusible alloy or the like extending over the terminals 4, 5 is actually mounted. After that, the terminals 4, 5 (fusible metal connections 6, 7) and the fusible metal 16 are connected to each other by welding or the like. A method of welding by a soldering iron, electric welding, laser welding, or soft beam welding is employed for welding.

In that case, for the alloy of the fusible metal 16, when the theoretical density is "D1" and the density measured after processing is "D2", it is preferable to be D2/D1>0.98. Particularly, it is preferable to be D2/D1>0.995. Thus, void in the fusible metal 16 will be lessened. Moreover, generation of defective welding can be prevented since the residual oxide is little enough. As a result, the yield of non-defective products in the manufacture will be improved. In the measurement of theoretical density "D1" of the fusible metal, about 100 g of fusible metal was heated and fused in the welding flux to eliminate the oxide. After that, it was heated and fused in a vacuum to eliminate the gas content in the molten metal. Subsequently, it was cooled and cured in a vacuum, and left in a desiccator at 25° C. for 168 hours. The density of the fusible metal thus treated was measured by the Archimedes' method. The density of the fusible metal 16 formed in plate or wire shape was measured by the Archimedes's method.

Table 5 shows the relationship between the density ratio of D2/D1 and welding yield.

TABLE 5

Fusible alloy density and welding yield

| | Fusible alloy | | | |
| --- | --- | --- | --- | --- |
| No. | Theoretic density D1 [g/cm$^3$] | Measured density D2 [g/cm$^3$] | Density ratio D2/D1 | Welding yield judgement [%] |
| No.1 | 9.7072 | 9.6961 | 0.9989 | ○ |
| No.2 | 9.7072 | 9.6791 | 0.9971 | ○ |
| No.3 | 9.7072 | 9.6550 | 0.9946 | Δ |
| No.4 | 9.7072 | 9.6135 | 0.9903 | Δ |
| No.5 | 9.7072 | 9.5017 | 0.9788 | x |

Terminals 4, 5 are formed of nickel alloy of 3 mm in width, 0.15 mm in thickness and 13 mm in length. Fusible metal connections 6, 7 are plated with tin by 3 μm in thickness. PET (polyethylene terephthalate) of 0.125 mm thick was used as the substrate 1 and bonding film 10. A thermal fuse formed of alloy material containing Sn, In and Pb was used as the fusible metal 16. The alloy melts down at 89±2° C. The fusible metal 16 is 0.14 mm in thickness, 0.91 mm in width, and 3 mm in length. The distance between the terminals 4, 5 is 1.7 mm. A laser welding process was employed for welding. In evaluation of the yield by welding 1,000 pieces of members, when the resistance is in a range of 13±1 mΩ, it is judged to be "non-defective". Calculating the quantity of the "non-defectives", when the welding yield is less than 50%, it is judged to be "x", and when the welding yield is 50% to 90%, it is judged to be "Δ", and when the welding yield is over 90%, it is judged to be "○".

Table 5 reveals the following. That is, when the density ratio D2/D1>0.995 is established, void in the fusible metal 16 is lessened. Moreover, since the residual oxide is little enough, defective welding to the terminals 4, 5 becomes hard to take place. As a result, the yield will be improved. Particularly, it is preferable that the ratio D2/D1>0.98 be satisfied, and then the above advantages will be further enhanced.

In the present embodiment, the fusible metal 16 is plate-form rectangular in section, but it is not limited to this shape. It is also possible to use fusible metal 16 having a wire or bar shape, by which the same advantages as mentioned above can be obtained.

Figure 19:
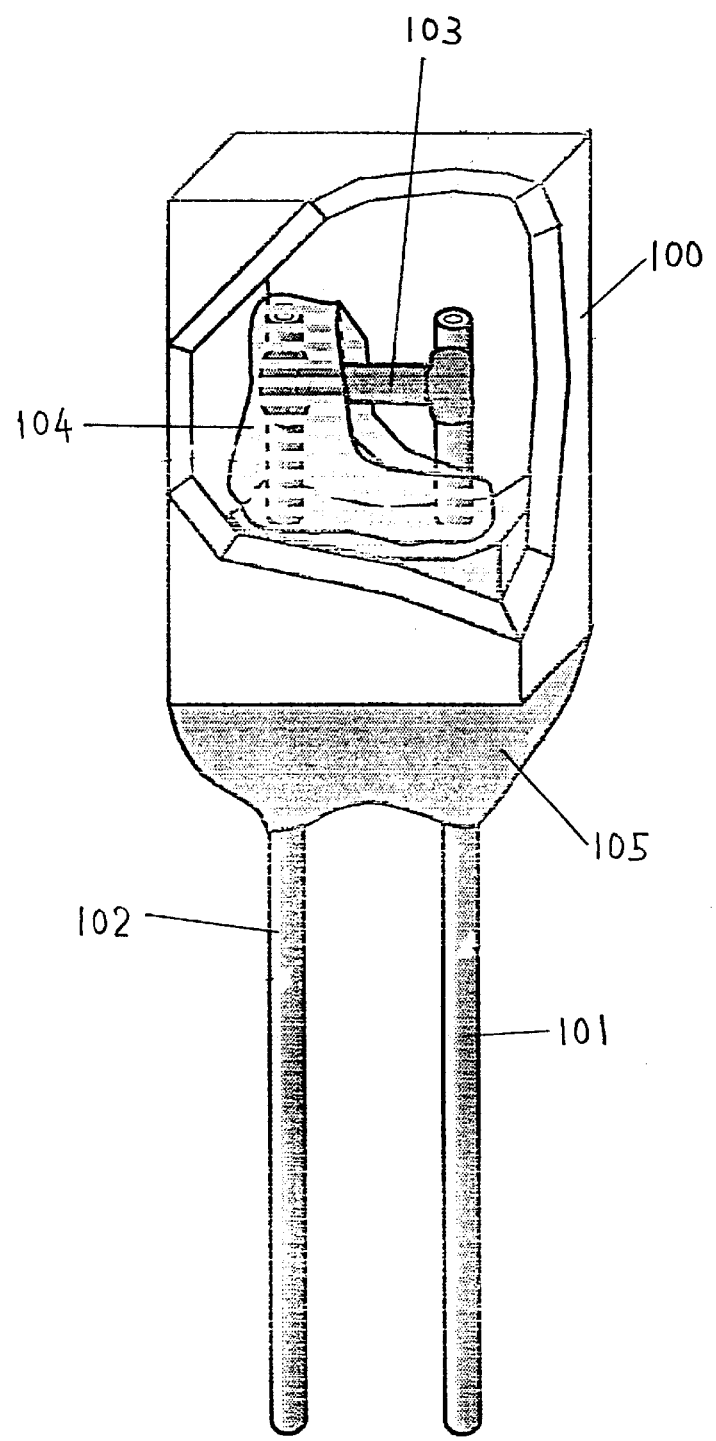
FIG. 19 is a perspective view of a thermal fuse in one embodiment of the present invention.
Figure 20:
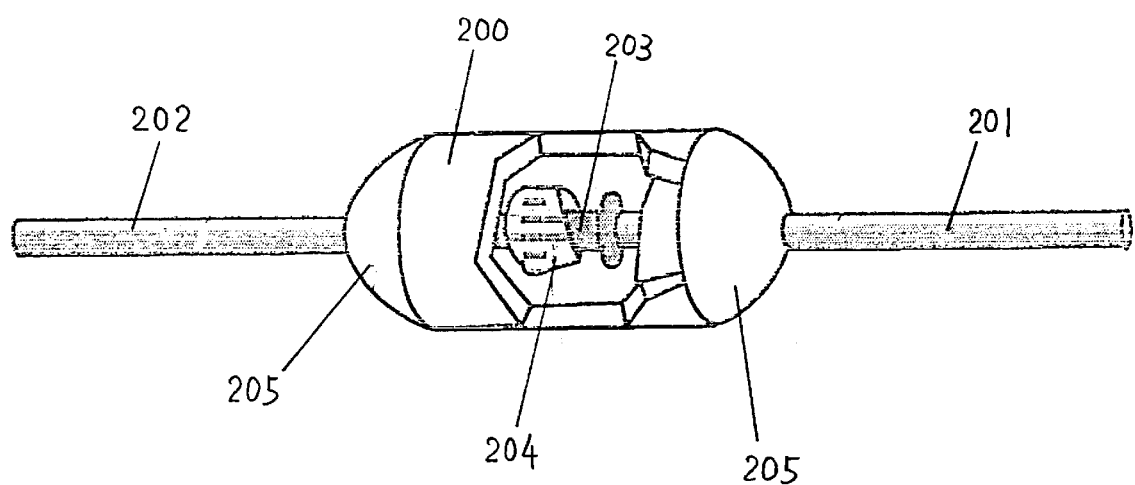
FIG. 20 is a perspective view of a thermal fuse in one embodiment of the present invention.
Figure 21:
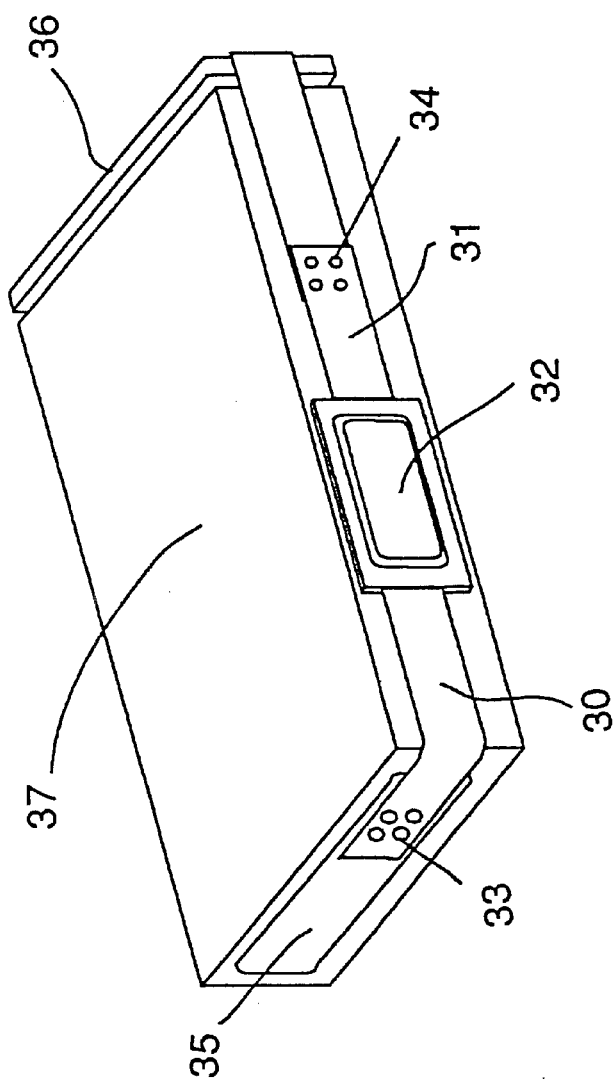
FIG. 21 is a perspective view of a conventional battery pack.
Figure 22:
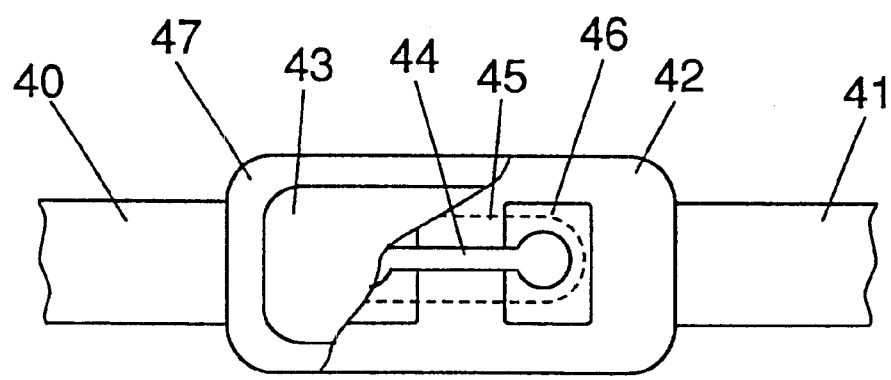
FIG. 22 shows the appearance and interior of a conventional thermal fuse.
Figure 23:
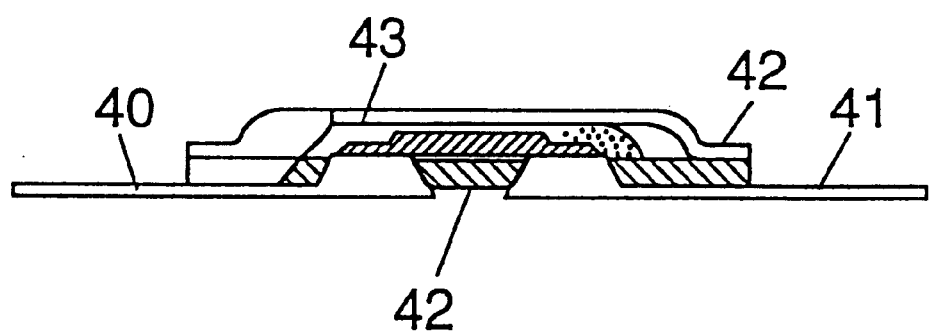
FIG. 23 is a sectional view of a conventional thermal fuse.
Figure 24:
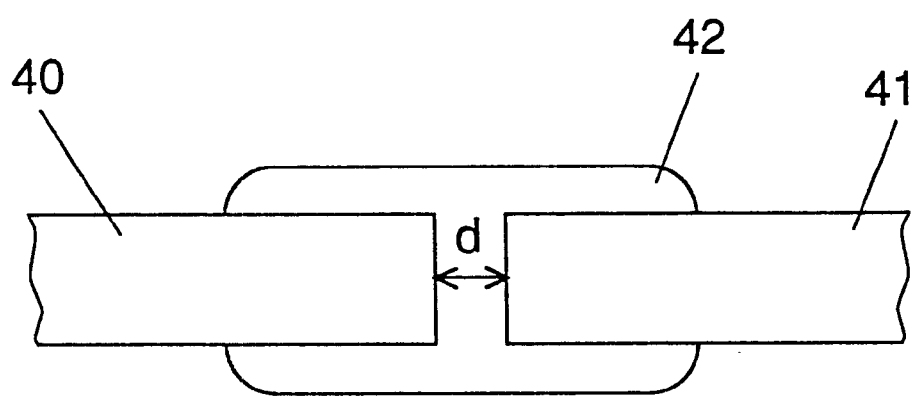
FIG. 24 shows a part of the configuration of a conventional thermal fuse.

Further, in fusible metal 16, when the theoretical density is D1 and the density measured after processing is D2, besides the configuration where the ratio D2/D1>0.995 is established, a configuration as shown in FIG. 19 or FIG. 20 can also be employed. FIG. 19 and FIG. 20 show the thermal fuse configurations in another embodiment of the present invention.

In FIG. 19, a fusible metal 103 connected to the end portions of paired leads 101, 102 is inserted into case 100 having an opening. The opening of the case 100 is formed at one end of the case. Flux 104 is disposed at the peripheral portion of fusible metal 103. Sealing member 105 is disposed so as to close the opening of the case 100. Resin or the like is used as the sealing member 105. The inside of the case 100 is isolated from the outside by the sealing member 105. In this configuration, when the fusible metal 103 satisfies the condition of D2/D1>0.995 (preferably, D2/D1>0.98), the same advantages as mentioned above can be obtained. A thermal fuse of such type is generally a radial thermal fuse.

Also, as shown in FIG. 20, a fusible metal 203 connected to the end portions of paired leads 201, 202 is inserted into case 200 having openings. The openings of the case 200 are formed at either end of the case. Flux 204 is disposed at the peripheral portion of fusible metal 203. Sealing members 205 are disposed so as to close the openings of the case 200. Resin or the like is used as the sealing member 205. The inside of the case 200 is isolated from the outside by the sealing member 205. In this configuration, when the fusible metal 203 satisfies the condition of D2/D1>0.995 (preferably, D2/D1>0.98), the same advantages as mentioned above can be obtained. A thermal fuse of such type is generally an axial thermal fuse.

Further, specifically, an alloy based on a material containing at least one selected from the group consisting of Sn, In, Bi, Pb, and Cd is commonly known as a material for fusible metal 16. In the present embodiment, the fusible metal 16 was manufactured by using a metal alloyed with Sn, In, Bi or Pb, containing no Cd that is harmful.

Figure 9:
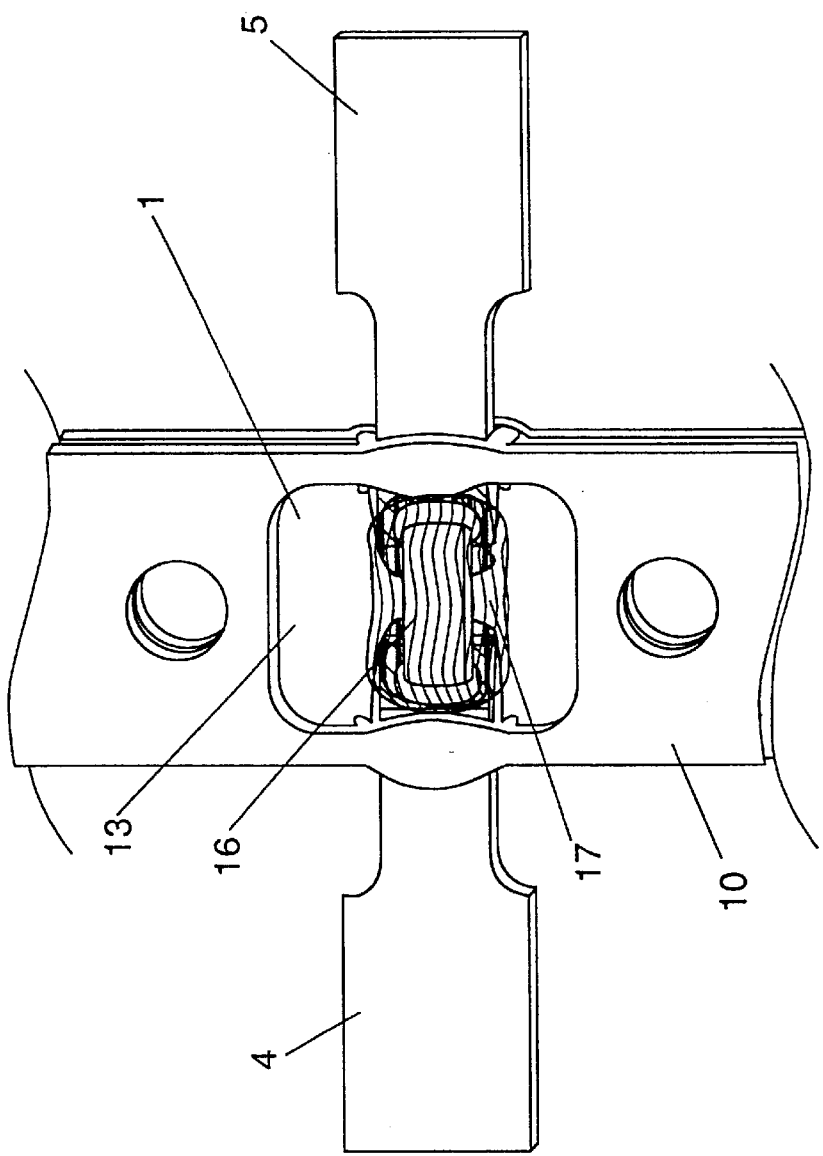
FIG. 9 shows a process of manufacturing a thermal fuse in one embodiment of the present invention.

Next, as shown in FIG. 9, solid flux 17 is disposed so as to cover the fusible metal 16. Preferably, the solid flux 17 completely covers the fusible metal 16. Also, at least 50% of the surface area of the fusible metal 16 being exposed is covered with the solid flux 17. In this way, sufficient fusing characteristics can be obtained.

Flux in a state of being melted with heat or a solvent is applied to the fusible metal 16, and after that, the flux is hardened to form the solid flux 17.

Preferably, the solid flux 17 contains rosin. The rosin used contains 50 wt % to 90 wt % of abietic acid and 10 wt % to 50 wt % of dehydroabietic acid. That is, the rosin contained in the solid flux 17 is nearly same in component as the rosin contained in welding flux 14, 15. Thus, the fusing characteristics will be further improved. Also, by disposing the solid flux 17 containing the rosin mentioned above, it becomes possible to recognize the yellow color, and accordingly, the quantitative recognition can be executed by image checking. In addition, as described above, alcohol contained in the solid flux 17 will get therein. Also, the flux is inactive at a temperature lower than the softening point. Therefore, flux having the above composition is most suitable as solid flux for thermal fuses.

In the thermal fuses shown in FIG. 19 and FIG. 20, same material as for the above solid flux can be used for flux 104 and 204. By this configuration, the same advantages as described above can be obtained.

Figure 10:
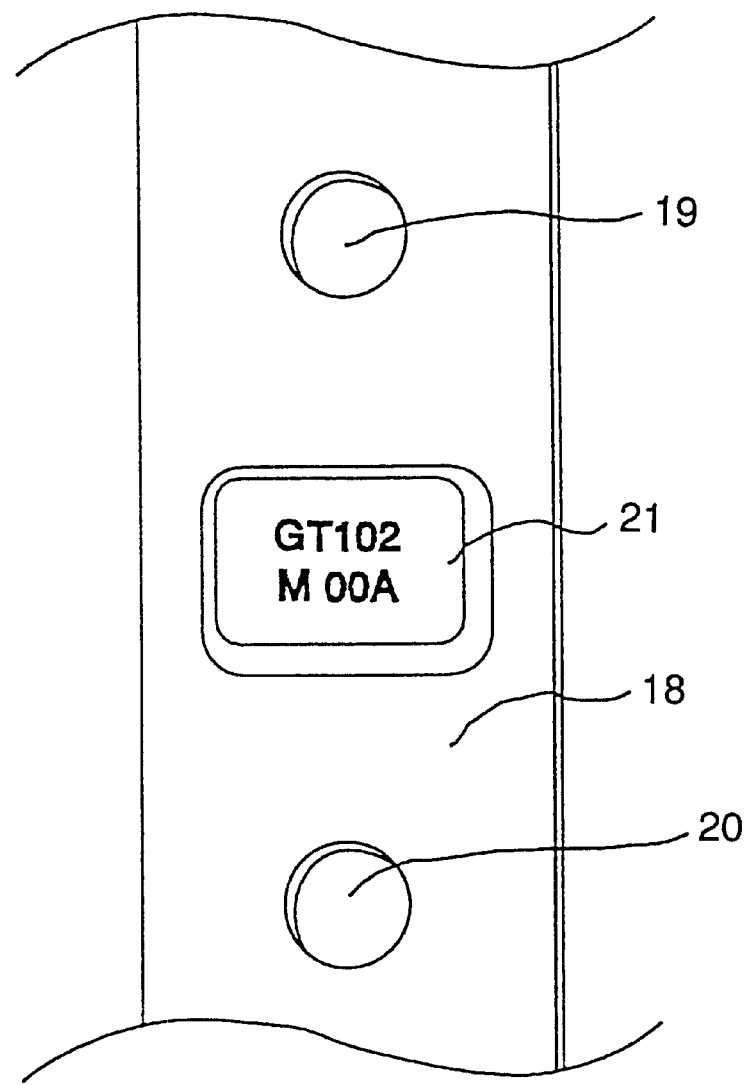
FIG. 10 shows a process of manufacturing a thermal fuse in one embodiment of the present invention.
Figure 11:
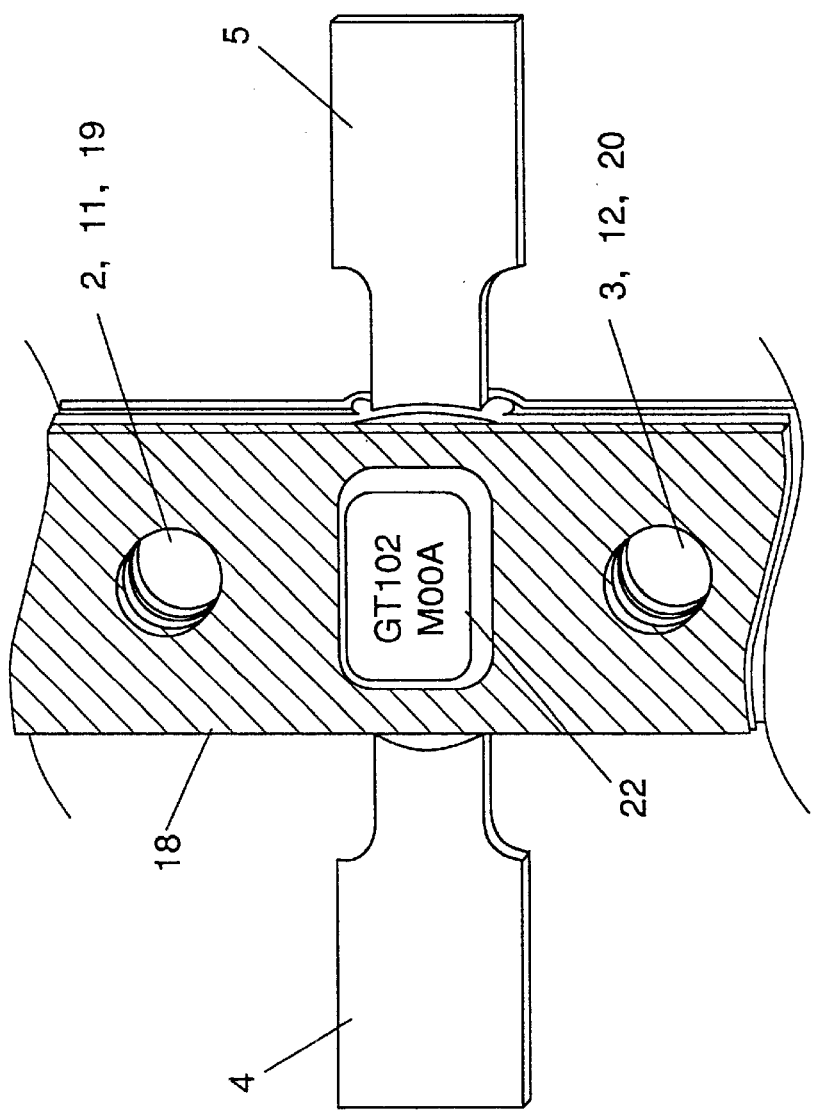
FIG. 11 shows a process of manufacturing a thermal fuse in one embodiment of the present invention.

Next, cover film 18 as shown in FIG. 10 is placed on bonding film 10 as shown in FIG. 11. The cover film 18 includes fourth through-holes 19, 20 for positioning, and a recess 21 disposed between the fourth through-holes 19, 20 and depressed lower in level than other portions. In the present embodiment, the profile of the recess 21 is nearly rectangular. However, it is also possible to employ a circular shape, oval shape, rectangular shape or the like as the shape of the recess 21. The recess 21 forms a space around the fusible metal 16. As a result, the fusible metal 16 may precisely serve the function of breaking.

As shown in FIG. 11, the cover film 18 is disposed on the bonding film 10 in such manner that third through-hole 13 is opposed to recess 21, and the fourth through-holes 19, 20 are arranged so as to be placed on first through-holes 2, 3 and second through-holes 11, 12. In FIG. 11, the recess 21 causes a rise portion 22 to be formed. The top surface of the rise portion 22 carries the model No. and the safety indications given by printing or the like. For printing the model No. and the safety indications on the rise portion 22, ultraviolet drying ink (ultraviolet curing ink) based on acrylic oligomer having 150° C. heat resistance was employed. The ink contains a coloring pigment as desired out of white, black, red, green, orange, blue, purple, gray, silver, etc. In the printing process, the ink is transferred from the relief plate onto the rubber roller, and further transferred onto the cover film 18. The pressure of the rubber roller and cover film 18 is adjusted so that the ink on the cover film 18 becomes 1 to 5 μm in thickness. Ultraviolet drying is performed by application of ultraviolet rays close to 365 nm in wavelength for 5 to 15 seconds in an atmosphere of 90±10° C. If the ink thickness is less than 1 μm, the concentration of the ink will be too low, causing the indications to become unreadable. If the ink thickness exceeds 5 μm, the ultraviolet rays will be hard to reach the inside of the ink in the drying process, resulting in insufficient hardening of the ink and lowering of the ink adhesion.

Table 6 shows the ink thickness for model No. and safety indications, and the relationship between readability of indications and fusing temperatures.

TABLE 6

Ink thickness for model No. and safety indications,
and readability of indications, and fusing temperatures

| | Printing conditions | | | Readability | Check for |
|---|---|---|---|---|---|
| No. | Ink thickness [μm] | Drying temp. [° C.] | Drying time [sec] | of indications after adhesion test | coincidence of indications and fusing temperatures |
| No. 1 | 0.8 | 90 | 10 | x | x |
| No. 2 | 2.2 | 90 | 10 | ○ | ○ |
| No. 3 | 3 | 90 | 10 | ○ | ○ |
| No. 4 | 4.5 | 90 | 10 | ○ | ○ |
| No. 5 | 7 | 90 | 10 | x | x |
| No. 6 | 8 | 90 | 10 | x | x |

Terminals 4, 5 were prepared as samples by using nickel alloy of 3 mm in width and 0.15 mm (T2) in thickness. Substrate 1, bonding film 10 and cover film 18 are made of PET of 0.125 mm in thickness (polyethylene terephthalate). Pb, Bi, Sn alloy which fuses at 102±7° C. was used as fusible metal 16. As for the indications, the model No., GT102 as fusing temperature, and 00A as manufacturing No. were printed on the rise portion 22, and the profile was finished as shown in FIG. 16.

In the adhesion test, thermal fuses were used by 100 pcs each, and a gum tape was stuck on the rise portion 22 of FIG. 16, and then, the gum tape was removed. In checking the readability, when all the indications are readable visually or by using a magnifying glass of x10 after the adhesion test, it is judged to be "○", and when one or more indications are unreadable, it is judged to be "x". Also, in checking for coincidence of the indications and the fusing temperatures, when all melt down at the temperatures corresponding to the readable model numbers, it is judged to be "○", and when the coincidence of the fusing temperature and the indication cannot be confirmed because of unreadable model No. for one or more samples, it is judged to be "x."

Table 6 reveals the following. That is, by adjusting so that the ink thickness on the cover film 18 ranges from 1 μm to 5 μm, the model No. and safety indications can be precisely printed. Further, the characteristics (fusing temperatures of fusible metal 16) and indications of the content can be precisely brought into coincidence with each other.

In the present embodiment, PET (polyethylene terephthalate) film was used as an insulating case material, but it is not limited to this material. It is also possible to use a case having a ceramic surface such as alumina as an insulating case. Also, a metallic material such as stainless steel can be used for such insulating case. In this case, when the ink thickness is in a range from 1 μm to 5 μm, it is possible to give the indications that are excellent in readability and adhesion.

Preferably, the cover film 18 is formed of a material having an insulation. Thermoplastic resin mainly containing one selected from the group consisting of PET (polyethylene terephthalate), PEN (polyethylene naphthalate), ABS resin, SAN resin, polysanfone resin, polycarbonate resin, Noryl, vinyl chloride resin, polyethylene resin, polyester resin, polypropylene resin, polyamide resin, PPS resin, polyacetal, fluorocarbon resin, and polyester is used as the cover film 18.

Figure 12:
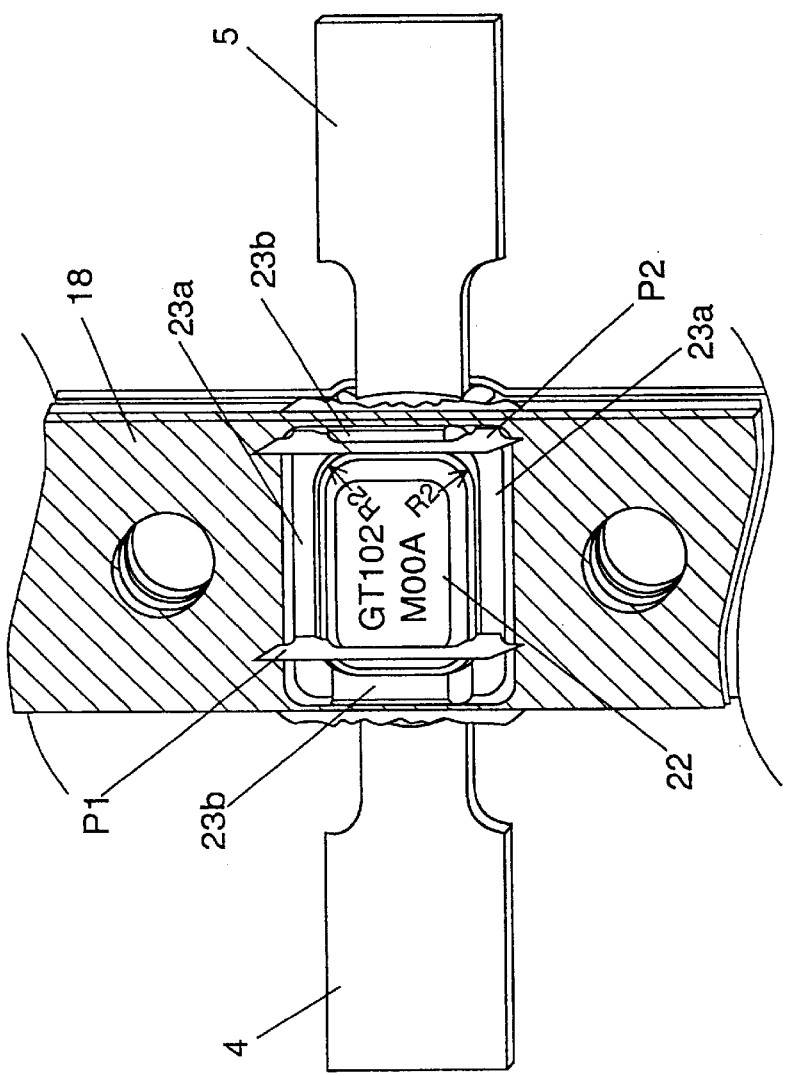
FIG. 12 shows a process of manufacturing a thermal fuse in one embodiment of the present invention.
Figure 13:
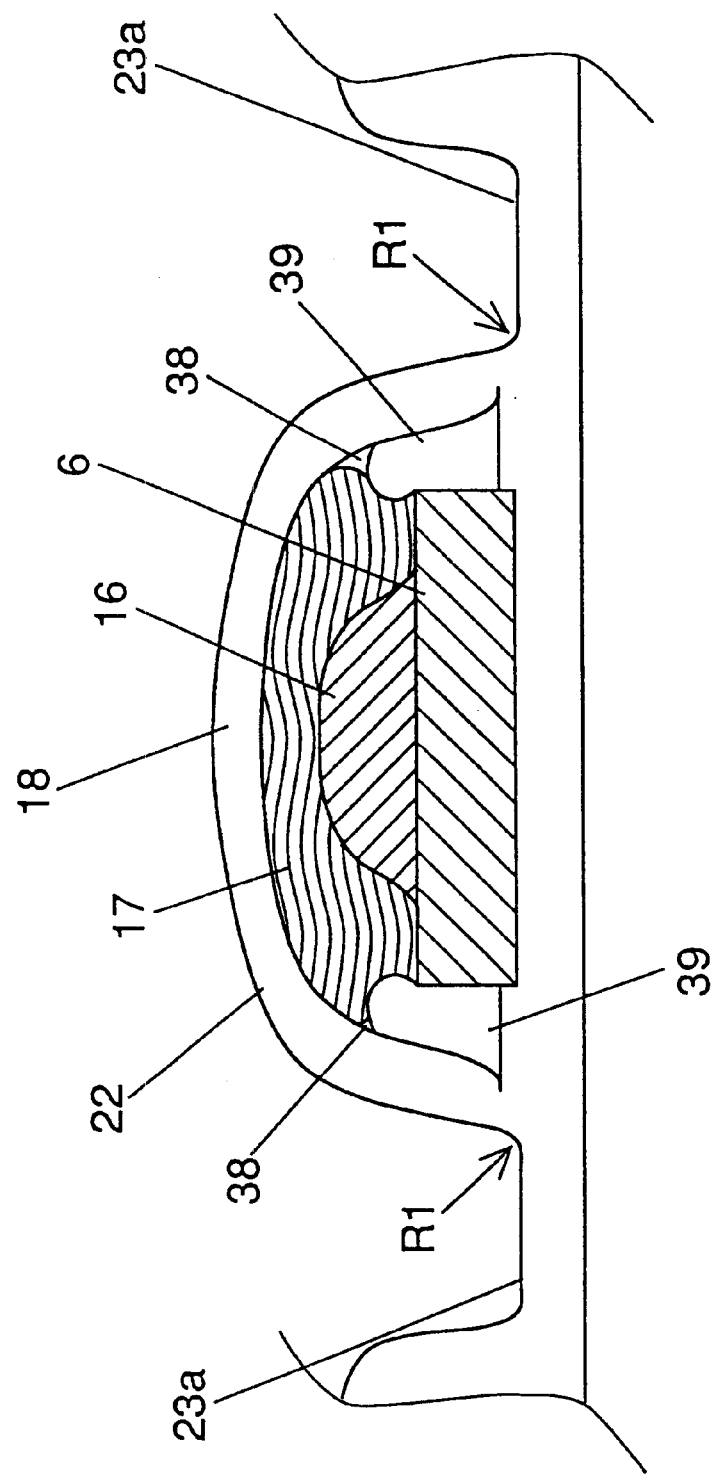
FIG. 13 is a fragmentary sectional view of a thermal fuse in one embodiment of the present invention.
Figure 14:
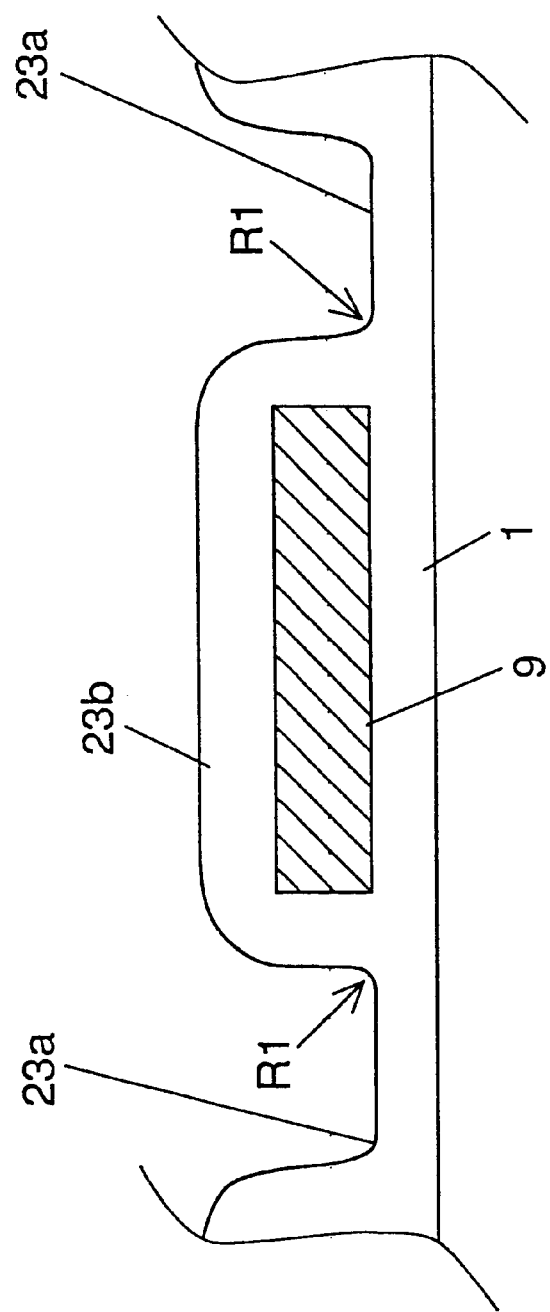
FIG. 14 is a fragmentary sectional view of a thermal fuse in one embodiment of the present invention.

Next, as shown in FIG. 12, a supersonic welding horn is pushed against the area around the rise portion 22 of the cover film 18 to weld the cover film 18 and bonding film 10. Each of FIG. 13 and FIG. 14 is a sectional view of the thermal fuse shown in FIG. 12 in a state of having been cut by P1 and P2. In FIG. 13 and FIG. 14, blowhole 38 is formed between substrate 1 and cover film 18, that is, in a space (hereafter sealed space) shielded from the outside. Melt 39 is protruded into the sealed spaced. The substrate 1, bonding film 10, and cover film 18 are all together subjected to supersonic welding as described above. A weld deposit zone 23a is formed along the lengthwise direction of terminals 4, 5 so as to sandwich the thermal fuse body, and a weld deposit zone 23b is formed nearly perpendicular to the weld deposit zone 23a so as to sandwich the thermal fuse body.

Preferably, as shown in FIG. 13 and FIG. 14, curvature "R" or chamfer "R1" of 0.1 mm or over is formed at the boundary portion between the rise portion 22 and the weld deposit zone 23a. In this way, a sealed space can be precisely created. Accordingly, there will be very little possibility of collapsing of the sealing through use for a long period of time. Further, it is possible to prevent the cover film 18 from being damaged during the manufacture. Similarly, although it is not shown, a sealed space can be precisely formed since curvature "R" or chamfer (R1) of 0.1 mm or over is formed at the boundary portion between the weld deposit zone 23b formed on terminals 4, 5 and the portion sandwiched by the weld deposit zones 23b. As a result, there will be very little possibility of collapsing of the sealing through use for a long period of time. Further, it is possible to prevent the cover film 18 from being damaged during the manufacture.

Preferably, as a means to make the chamfer "R", a supersonic welding horn provided with curvature "R" or chamfer of 0.1 mm or over at the corner thereof is employed.

As shown in FIG. 12, "R" ("R2" in FIG. 12) of 0.3 mm or over is formed at the outer periphery corner of rise portion 22 or at the boundary portion between rise portion 22 and weld deposit zone 23a, 23b. In the present embodiment, since the profile is square in shape, "R" may be formed at the four corners. Thus, a sealed space can be precisely created. Therefore, there will be very little possibility of collapsing of the sealing through use for a long period of time. Further, it is possible to prevent the cover film 18 from being damaged during the manufacture.

Figure 15:
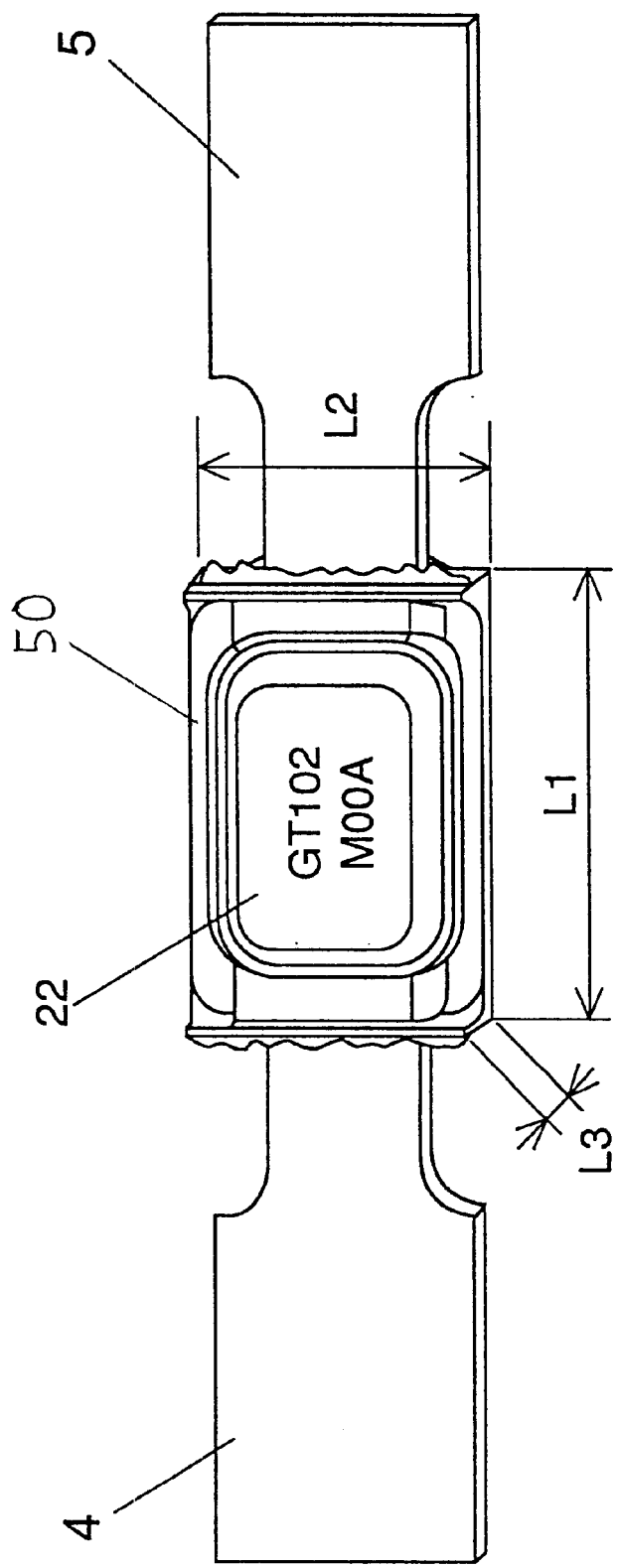
FIG. 15 shows a process of manufacturing a thermal fuse in one embodiment of the present invention.

Finally, as shown in FIG. 15, excess part is cut off. Thus, Aa thermal fuse will be completed. That is, the thermal fuse comprises paired terminals 4, 5, fusible metal 16 disposed between the paired terminals, solid flux 17 covering the fusible metal 16, cover film 18 covering the solid flux 17, and bonding film 10. The bonding film has third through-hole 13, and the solid flux 17 is exposed inside the third through-hole 13. The cover film 18 is disposed so as to cover the bonding film 10 and the exposed solid flux 17. The terminals 4, 5 respectively include fusible metal connections 6, 7 and film bonding portions 8, 9. The fusible metal 16 is connected between the fusible metal connections 6, 7. The bonding film 10 is bonded to each of the film bonding portions 8, 9. Fuse main body 50 includes the portion located between the exposed paired terminals 4, 5. That is, the fuse main body 50 comprises the fusible metal 16 disposed between the paired terminals, the solid flux 17 covering the fusible metal 16, the bonding film disposed in a zone except the solid flux, and the cover film 18 which covers the solid flux 17 and is disposed on the bonding film. The fuse main body 50 has a function as a case.

In the present embodiment, the solid flux 17 was directly applied to the fusible metal 16, but it is not limited to this method. It is also possible to use the following method. That is, the solid flux 17 being in a solid state is previously placed in recess 21 made in the cover film 18. Subsequently, the cover film 18 is placed on the bonding film 10, and then heated to melt the solid flux 17, and the flux is applied to the fusible metal 16. After that, the cover film 18 is bonded to the bonding film by supersonic welding.

Figure 17:
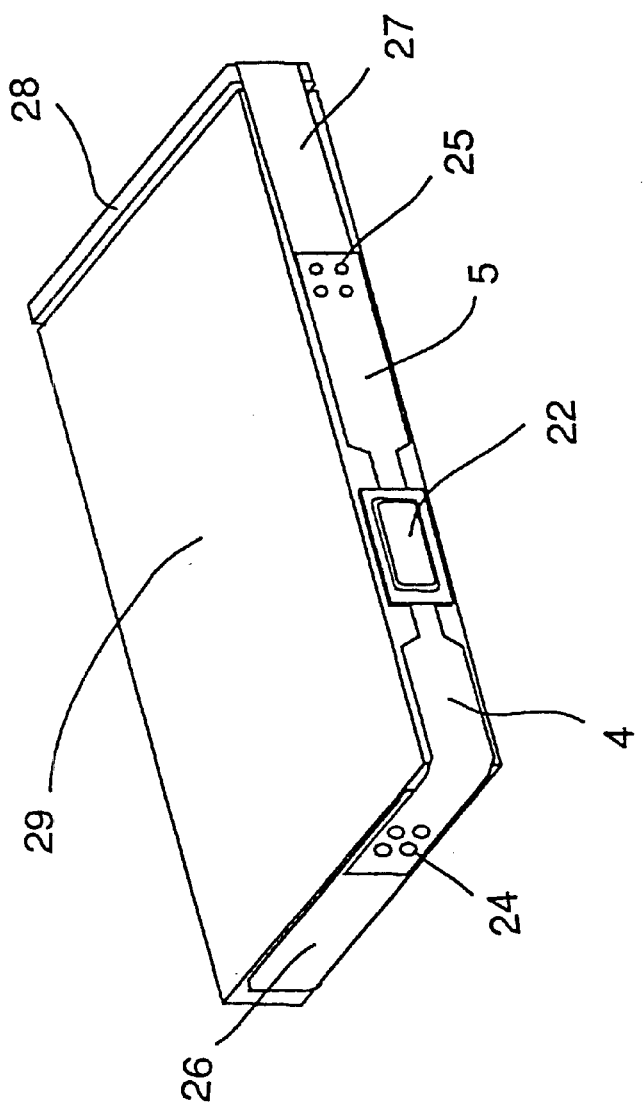
FIG. 17 is a perspective view of a battery pack in one embodiment of the present invention.

As shown in FIG. 17, a thermal fuse of the present embodiment is disposed on the side surface of a battery pack. By this configuration, the battery pack can be made less in thickness and size as compared with the conventional battery pack shown in FIG. 19. Further, the loss in resistance value of wiring portion 23 may be kept down at the level of a conventional battery pack.

In FIG. 17, batteries (not shown) are built into battery back body 29. The battery pack comprises external electrodes 26 of the built-in batteries, protective circuit board 28 connected to the batteries, and nickel strip wires 27 connected to the protective circuit board 28. The thermal fuse of the present embodiment is installed between the external electrode and the nickel strip wire 27. When the heat generated form the built-in batteries and the like exceeds the predetermined level, the thermal fuse blows, thereby breaking the circuit including the built-in batteries.

Thus, by disposing the thermal fuse of the present embodiment on the side surface of a generally cubic battery storing case, it is possible to reduce the battery size.

Preferably, in the thermal fuse of FIG. 15, when the length of the thermal fuse main body (case) is L1, the width is L2, and the thickness is L3, then the main body 50 has a shape that satisfies a relationship as follows:

$$2.0 \text{ mm} < L1 < 7.5 \text{ mm}$$

$$0.4 \text{ mm} < L3 < 1.5 \text{ mm}.$$

Further preferably, the main body 50 has a shape that satisfies a relationship as follows:

$$1.5 \text{ mm} < L2 < 3.5 \text{ mm}.$$

When L1, L2, and L3 are smaller than the above respective ranges, it will cause slightly poor insulation resistance and dielectric strength in case of thermal fuse operation or disconnection due to heat. In case L1, L2, and L3 are larger than the above respective ranges, it will cause the thermal fuse to be increased in size, thereby greatly limiting the size of the small battery pack to be used.

As described above, by the configuration of the present invention, a thermal fuse reduced in size and thickness can be obtained. In addition, the thermal fuse will not be degraded in characteristics, productivity, reliability, quality, etc. even after reduction in size and thickness. Further, a battery pack using the thermal fuse may be reduced in size, and also, the battery pack ensures excellent thermal fuse characteristics.

What is claimed is:

1. A thermal fuse, comprising:
   (a) a fuse main body having a substrate, a fusible metal and a cover;
   (b) a pair of terminals protruding from said fuse main body, said pair of terminals including a first terminal and a second terminal,
   one end of said first terminal extending from one end of said fuse main body, and
   one end of said second terminal extending from the other end of said fuse main body,
   wherein the other end of said first terminal includes a first fusible metal connection;
   the other end of said second terminal includes a second fusible metal connection;
   said fusible metal is disposed between said first terminal and said second terminal;
   one end of said fusible metal is connected to said first fusible metal connection, and the other end of said fusible metal is connected to said second fusible metal connection;
   said cover is disposed so as to cover said fusible metal, said first fusible metal connection, and said second fusible metal connection; and
   length L1 of said fuse main body positioned between said first terminal and said second terminal and thickness L3 of said main body are in a relationship as follows:

$$2.0 \text{ mm} < L1 < 8.5 \text{ mm}$$

$$0.4 \text{ mm} < L3 < 2.5 \text{ mm}.$$

2. The thermal fuse of claim 1,
   wherein the width of said first fusible metal connection is less than the width of said first terminal, and the width of said second fusible metal connection is less than the width of said second terminal.
3. The thermal fuse of claim 2,
   wherein each terminal of said first terminal and second terminal ranges from 0.08 mm to 0.25 mm in thickness.
4. The thermal fuse of claim 1,
   wherein said fuse main body further comprises an bonding film disposed between said substrate and said cover;
   said bonding film has a third through-hole; and
   said fusible metal, said first fusible metal connection, and said second fusible metal connection are located in said third through-hole.
5. The thermal fuse of claim 4,
   wherein a side of said fuse main body is sealed with weld deposit zone formed due to melting of said bonding film.
6. The thermal fuse of claim 4,
   wherein the relationship between width T1 and thickness T2 of said weld deposit zone is as follows:

$$0.9 < T1 < T2 < 4.0.$$

7. The thermal fuse of claim 4,
   wherein said first terminal further includes a first film bonding portion;
   said second terminal further includes a second film bonding portion;
   said bonding film is bonded to said first film bonding portion and second film bonding portion, and is disposed on said substrate; and
   said fusible metal, said first fusible metal connection and said second fusible metal connection are arranged in said third through-hole.
8. The thermal fuse of claim 4,
   wherein said bonding film is formed of thermoplastic;
   said first film bonding portion and said second film bonding portion have surfaces rougher than the other surfaces of said first terminal and said second terminal; and
   the surfaces of said first film bonding portion and said second film bonding portion are bonded to said bonding film by thermo-deposition of said bonding film.
9. The thermal fuse of claim 4,
   wherein said substrate is formed of thermoplastic;
   each back side of said first film bonding portion and said second film bonding portion has at least one of (i) a surface rougher than the other surfaces of said first terminal and said second terminal,
(ii) a surface with a coupling agent stuck thereon; and
said first film bonding portion and said second film bonding portion are bonded to said substrate by thermo-deposition of said substrate.

10. The thermal fuse of claim 1,
wherein each terminal of said first terminal and said second terminal ranges from $3 \times 10^{10}$ Pa to $8 \times 10^{10}$ Pa in Young's modulus, and from $4 \times 10^8$ Pa to $6 \times 10^8$ Pa in tensile strength.

11. The thermal fuse of claim 1,
wherein each terminal of said first terminal and said second terminal includes a good conductor disposed in a zone protruded from said fuse main body.

12. The thermal fuse of claim 11,
wherein each terminal of said first terminal and said second terminal is made from at least one of nickel and nickel alloy, and
said good conductor has electric resistibility in a range from $1.4 \times 10^{-8}$ Ω·m to $5 \times 10^{-8}$ Ω·m.

13. The thermal fuse of claim 1,
wherein when the theoretical density of said fusible metal is D1 and the measured density of said fusible metal after machining is D2, then the relationship between D1 and D2 is D2/D1>0.98.

14. The thermal fuse of claim 1,
wherein said fuse main body further includes flux disposed close to or in contact with said fusible metal.

15. The thermal fuse of claim 14,
wherein said flux contains rosin as main component;
said rosin contains 50 wt % to 90 wt % of abietic acid and 10 wt % to 50 wt % of dehydroabietic acid; and
said flux is colored with visible rays transmitted.

16. The thermal fuse of claim 15,
wherein said rosin further contains alcohol.

17. The thermal fuse of claim 1,
wherein said substrate and said cover are formed of thermoplastic resin mainly containing at least one of polyethylene terephthalate and polyethylene naphthalate.

18. The thermal fuse of claim 1,
wherein each of said substrate and said cover is formed of thermoplastic resin;
said fuse main body includes a weld deposit zone and a rise portion;
said weld deposit zone is formed by weld deposit of said substrate and said cover; and
said rise portion is formed by said fusible metal and said cover which covers said fusible metal.

19. The thermal fuse of claim 18,
wherein a boundary portion located between said weld deposit zone and said rise portion is rounded or chamfered to have a curvature of at least 0.1 mm in radius.

20. The thermal fuse of claim 18,
wherein said rise portion is generally square in shape, and
a boundary portion located between the corner of said rise portion and said weld deposit zone is rounded or chamfered to have a curvature of at least 0.3 mm in radius.

21. The thermal fuse of claim 1,
wherein said fuse main body further includes a display section disposed on the surface of said cover.

22. The thermal fuse of claim 21,
wherein said display section includes ultraviolet hardening ink formed by printing, and
said display section ranges from 1 μm to 5 μm in thickness.

23. A battery pack, comprising:
(i) a battery;
(ii) a main boy to accommodate said battery;
(iii) wires led out of said main body and electrically connected to said battery; and
(iv) a thermal fuse disposed between said wires so as to contact with said main body,
wherein said thermal fuse comprises the thermal fuse of claim 1.

24. The battery pack of claim 23,
wherein the width of said first fusible metal connection is less than the width of said first terminal, and the width of said second fusible metal connection is less than the width of said second terminal in the above thermal fuse.

25. The battery pack of claim 23,
wherein said fuse main body further comprises an bonding film disposed between said substrate and said cover;
said bonding film has a third through-hole; and
said fusible metal, said first fusible metal connection and said second fusible metal connection are located in said third through-hole.

26. The battery pack of claim 25,
wherein said bonding film is formed of thermoplastic;
said first film bonding portion and said second film bonding portion have surfaces rougher than the other surfaces of said first terminal and said second terminal; and
the surfaces of said first film bonding portion and said second film bonding portion are bonded to said bonding film by thermo-deposit of said bonding film.

27. The battery pack of claim 23,
wherein each terminal of said first terminal and said second terminal ranges from $3 \times 10^{10}$ Pa to $8 \times 10^{10}$ Pa in Young's modulus, and from $4 \times 10^8$ Pa to $6 \times 10^8$ Pa in tensile strength.

28. The battery pack of claim 23,
wherein each terminal of said first terminal and said second terminal includes a good conductor disposed in a zone protruding from said fuse main body.

29. The battery pack of claim 23,
wherein said fuse main body further includes flux disposed close to or in contact with said fusible metal.

30. The battery pack of claim 23,
wherein said substrate and said cover are formed of thermoplastic resin mainly containing at least one of polyethylene terephthalate and polyethylene naththalate.

31. The battery pack of claim 23,
wherein each of said substrate and said cover is made of thermoplastic resin;
said fuse main body includes a weld deposit zone and a rise portion;
said weld deposit zone is formed by weld deposit of said substrate and said cover; and
said rise portion is formed by said fusible metal and said cover which covers said fusible metal.

32. The battery pack of claim 23,
wherein said fuse main body further includes a display section disposed on the surface of said cover.

33. A method of manufacturing a thermal fuse, comprising the steps of:
- (a) manufacturing at least one substrate of a strip substrate and a plate substrate;
- (b) disposing a first terminal and a second terminal opposed to each other on said substrate,
  where one end of said first terminal includes a first fusible metal connection, and one end of said second terminal includes a second fusible metal connection,
  said first fusible metal connection and said second fusible metal connection are opposed to each other on said substrate, and
  the other ends of said first terminal and said second terminal protrude in respective directions of said substrate;
- (c) placing an bonding film on said substrate with said first terminal and said second terminal disposed thereon, then heating under pressures said substrate and said bonding film thus laminated, thereby bonding said bonding film to said substrate by first weld deposit produced by heating,
  where said bonding film has a third through-hole, and said first fusible metal connection and said second fusible metal connection are exposed inside said third through-hole;
- (d) disposing a fusible metal between said first fusible metal connection and said second fusible metal connection;
- (e) disposing a cover film to cover said fusible metal and said bonding film, then heating said cover film and said bonding film positioned around said fusible metal except the zone where said fusible metal is disposed, thereby bonding said bonding film to said cover film by second weld deposit produced by heating; and
- (f) forming a fuse main body by cutting off weld deposit zones, so as to include a part of the weld deposit zone between said cover film and said bonding film bonded by said second weld deposit,
  where said fuse main body includes a rise portion and the, weld deposit zones, and said fusible metal is located in said rise portion.

34. The method of manufacturing a thermal fuse of claim 33,
wherein said substrate has two first through-holes;
said bonding film has two second through-holes;
said cover film has two fourth through-holes;
in the above step (b), said first terminal and said second terminal are disposed opposing to each other between said two first through-holes;
in the above step (c), said bonding film is positioned on said substrate in such manner that said two second through-holes are aligned to said two first through-holes; and
in the above step (e), said cover film is positioned on said bonding film in such manner that said two fourth through-holes are aligned to said two second through-holes.

35. The method of manufacturing a thermal fuse of claim 33,
wherein length L1 of said fuse main body positioned between said first terminal and said second terminal and thickness L3 of said main body are in a relationship as follows:

$$2.0 \text{ mm} < L1 < 8.5 \text{ mm}$$

$$0.4 \text{ mm} < L3 < 2.5 \text{ mm}.$$

36. The method of manufacturing a thermal fuse of claim 33,
wherein the width of said first fusible metal connection is less than the width of said first terminal, and
the width of said second fusible metal connection is less than the width of said second terminal.

37. The method of manufacturing a thermal fuse of claim 33,
wherein each terminal of said first terminal and said second terminal ranges from $3 \times 10^{10}$ Pa to $8 \times 10^{10}$ Pa in Young's modulus, and from $4 \times 10^8$ Pa to $6 \times 10^8$ Pa in tensile strength.

38. The method of manufacturing a thermal fuse of claim 33,
wherein each terminal of said first terminal and said second terminal includes a good conductor disposed in a zone protruding from said fuse main body.

39. The method of manufacturing a thermal fuse of claim 33,
wherein a side of said fuse main body is sealed by said second weld deposit.

40. The method of manufacturing a thermal fuse of claim 33, further comprising:
a step of applying flux containing rosin to the surface between said first fusible metal connection and said second fusible metal connection between said step (b) and said step (c).

41. The method of manufacturing a thermal fuse of claim 33,
wherein said substrate, said bonding film, and said cover film are formed of thermoplastic resin mainly containing at least one of polyethylene terephthalate and polyethylene naththalate.

42. The method of manufacturing a thermal fuse of claim 33,
wherein the step of disposing said cover film includes the steps of:
printing ultraviolet hardening ink on the surface of said cover film; and
forming a display section by applying ultraviolet rays to said ink.

43. The method of manufacturing a thermal fuse of claim 33,
wherein each of said substrate and said cover is formed of thermoplastic resin;
said fuse main body includes a weld deposit zone and a rise portion;
said weld deposit zone is formed by weld deposit of said substrate and said cover;
said rise portion is formed by said fusible metal and said cover which covers said fusible metal; and
the boundary portion between said weld deposit zone and said rise portion is rounded or chamfered to have a curvature of at least 0.1 mm in radius.

* * * * *

UNITED STATES PATENT AND TRADEMARK OFFICE
CERTIFICATE OF CORRECTION

PATENT NO. : 6,556,122 B2  Page 1 of 1
DATED : April 29, 2003
INVENTOR(S) : Masatoshi Izaki et al.

It is certified that error appears in the above-identified patent and that said Letters Patent is hereby corrected as shown below:

Title page,
Item [56], References Cited, FOREIGN PATENT DOCUMENTS, "JP 1-16466 1/1999" should read -- JP 11-16466  1/1999 --.
OTHER PUBLICATIONS, , "Office Action form Japanses Patent Office...JP Patent Application No. 2000-220452)." should read -- Office Action from Japanese...JP Patent Application No. 2000-220452). --
"Office Action...JP Patent Application No. 2001-269820)." should read -- Office Action...JP Patent Application No. 2001-369820). --

Signed and Sealed this

Tenth Day of February, 2004

JON W. DUDAS
*Acting Director of the United States Patent and Trademark Office*